United States Patent [19]
Senn et al.

[11] Patent Number: 6,151,610
[45] Date of Patent: Nov. 21, 2000

[54] DOCUMENT DISPLAY SYSTEM USING A SCRIPTING LANGUAGE HAVING CONTAINER VARIABLES SETTING DOCUMENT ATTRIBUTES

[75] Inventors: Jeffrey A. Senn; Peter Lucas, both of Pittsburgh; Rashi Khanna, Monroeville, all of Pa.

[73] Assignee: Digital Equipment Corporation, Maynard, Mass.

[21] Appl. No.: 08/579,559

[22] Filed: Dec. 27, 1995

Related U.S. Application Data

[63] Continuation of application No. 08/122,995, Dec. 27, 1993, abandoned.

[51] Int. Cl.$^7$ ................................. G06F 17/21
[52] U.S. Cl. ........................................ 707/516
[58] Field of Search ................... 395/144–148, 395/761, 776–778, 785, 786, 936, 200.34, 200.35; 707/514–516

[56] References Cited

U.S. PATENT DOCUMENTS

| | | | |
|---|---|---|---|
| 5,239,466 | 8/1993 | Morgan et al. | 395/148 |
| 5,261,041 | 11/1993 | Susman | 395/152 |
| 5,278,977 | 1/1994 | Spencer et al. | 395/575 |
| 5,287,447 | 2/1994 | Miller et al. | 345/342 |
| 5,303,166 | 4/1994 | Amalfitano et al. | 364/555.01 |
| 5,303,369 | 4/1994 | Borcherding et al. | 395/575 |
| 5,544,302 | 8/1996 | Nguyen | 345/326 |
| 5,627,958 | 5/1997 | Potts et al. | 395/336 |
| 5,745,910 | 4/1998 | Piersol et al. | 707/515 |
| 5,761,864 | 6/1998 | Gibson | 707/515 |
| 5,781,732 | 7/1998 | Adams | 395/200.35 |
| 5,801,701 | 9/1998 | Koppolu et al. | 345/352 |

OTHER PUBLICATIONS

Custer, "UserLand charts new Frontier", MacWEEK, v. 7, n. 9, p. 45, Mar. 1993.

Picarille, "MacWrite Pro has a secret: Scriptability", MacWEEK, v. 7, n. 12, p. 4, Mar. 1993.

Peterson et al., Operating System Concepts, Second Edition, p. 304, Jan. 1985.

Crabb, "After scripting revolution, only prepared will prosper", MacWEEK, v. 7. n. 20, p. 53, May 1993.

Swaine, "A tour of AppleScript", Dr. Dobb's Journal, v. 18, n. 9, p. 99(4), Sep. 1993.

Bowen, "Group to chart DTP standards", PC Week, v. 10, n. 42, p. 11, Oct. 1993.

Walter, "Compound documents: interchange and integration", The Seybold Report on Desktop Publishing; v. 5, n. 11, p. 10 (16), Jul. 22, 1991.

Card, S.K., Robertson, G.G., and Mackinlay, J.D., "The Information Visualizer, an Information Workspace," Proceedings of the CHI'91, ACM/SIGCHI, 1991, pp. 181–188.

Goodman, D., The Complete Hypercard Handbook, Bantam Books, New York, 1987, pp. 20–39, 85,86, 97–105, 341–413, 415, 469–470, 529–535.

Henderson, D.A. Jr., and Card, S.K., "Rooms: The Use of Multiple Virtual Workspaces to Reduce Space Contention in a Window–based Graphical User Interface," ACM Transactions on Graphics, vol. 5, No. 3, Jul. 1986, pp. 211–243.

(List continued on next page.)

*Primary Examiner*—Joseph H. Feild
*Attorney, Agent, or Firm*—Cesari and McKenna, LLP

[57] ABSTRACT

A document management apparatus has a scripting language which controls documents by setting the attributes of documents. Attributes are pieces of data within a document. A script engine reads a script from a cache memory and launches the processes to accomplish the desired action of the script. A scheduler controls the script engine and an active queue and a blocked queue in order to carry out multi-threaded execution.

6 Claims, 20 Drawing Sheets

OTHER PUBLICATIONS

Houde, S., "Iterative Design of an Interface for Easy 3–D Direct Manipulation," Proceedings of CHI'92, ACM/SIGCHI, 1992, pp. 135–142.

Kaufman, Lloyd, Sight and Mind: An Introduction to Visual Perception, Oxford University Press, New York, 1974, pp. 322–366.

Mackinlay, J.D., Robertson, G.G., and Card, S.K., "The Perspective Wall: Detail and Context Smoothly Integrated," Proceedings of CHI'91, ACM/SIGCHI, 1991, pp. 173–179.

MacLean, A., Carter, K., Lövstrand, L., and Moran, T., "User–tailorable Systems: Pressing the Issues with Buttons," Proceedings of CHI'90, ACM/SIGCHI, 1990, pp. 175–182.

Malone, T.W., "How Do People Organize Their Desks? Implications for the Design of Office Information Systems," ACM Transactions on Office Information Systems, Jan. 1983, pp. 99–112.

Robertson, G.G., Card, S.K., and Mackinlay, J.D., "The Cognitive Coprocessor Architecture for Interactive User Interfaces," Proceedings of the ACM SIGGRAPH Symposium on User Interface Software and Technology, ACM, 1989, pp. 10–18.

Wanger, L., "The Effect of Shadow Quality on the Perception of Spatial Relationships in Computer Generated Imagery," Proceedings of the Symposium on Interactive 3D Graphics, ACM/SIGGRAPH, 1992, pp. 39–42.

Wanger, L.R., Fewerda, J.A., and Greenberg, D.P., "Perceiving Spatial Relationships in Computer Generated Images," IEEE Computer Graphics and Applications, pp. 44–59, May 1992.

Venolia, D., "Facile 3D Direct Manipulation," Proceedings of INTERCHI'93, ACM/SIGCHI, 1993, pp. 31–36.

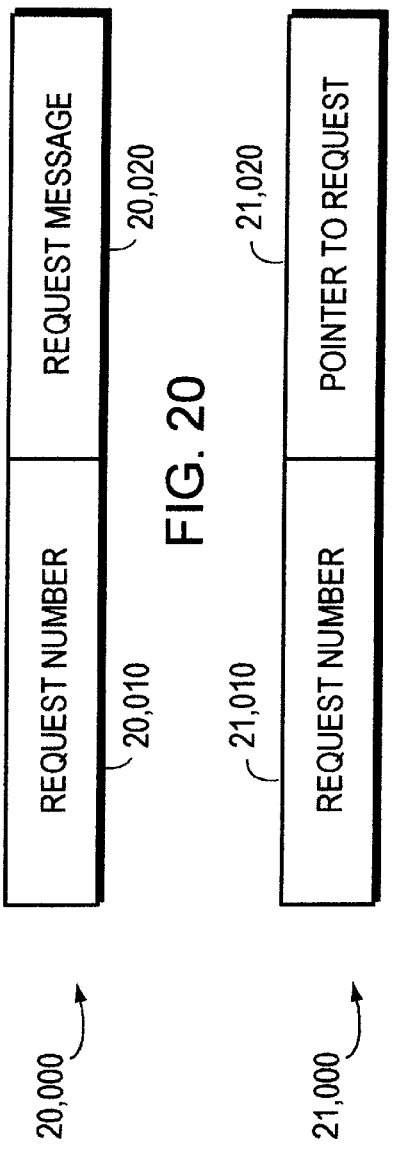
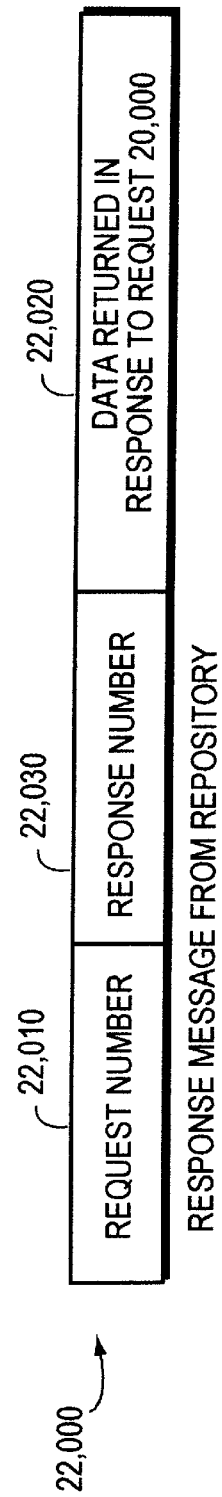
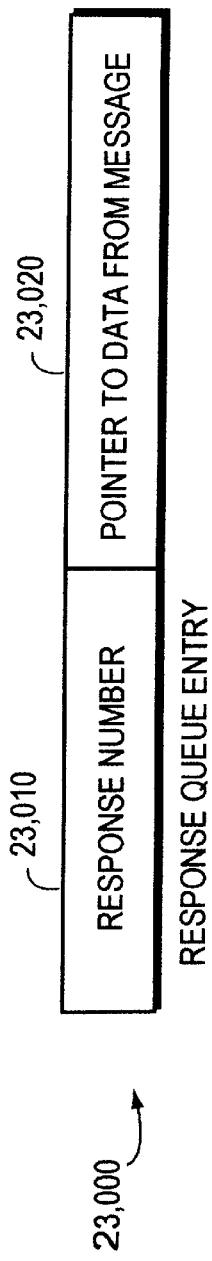
FIG. 20
FIG. 21
FIG. 22
FIG. 23

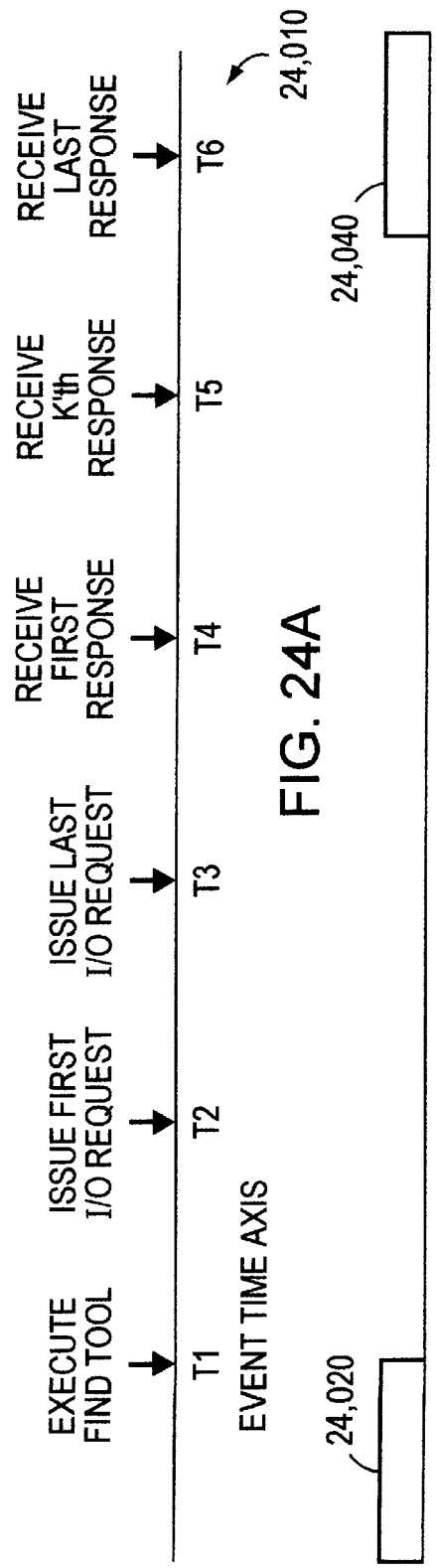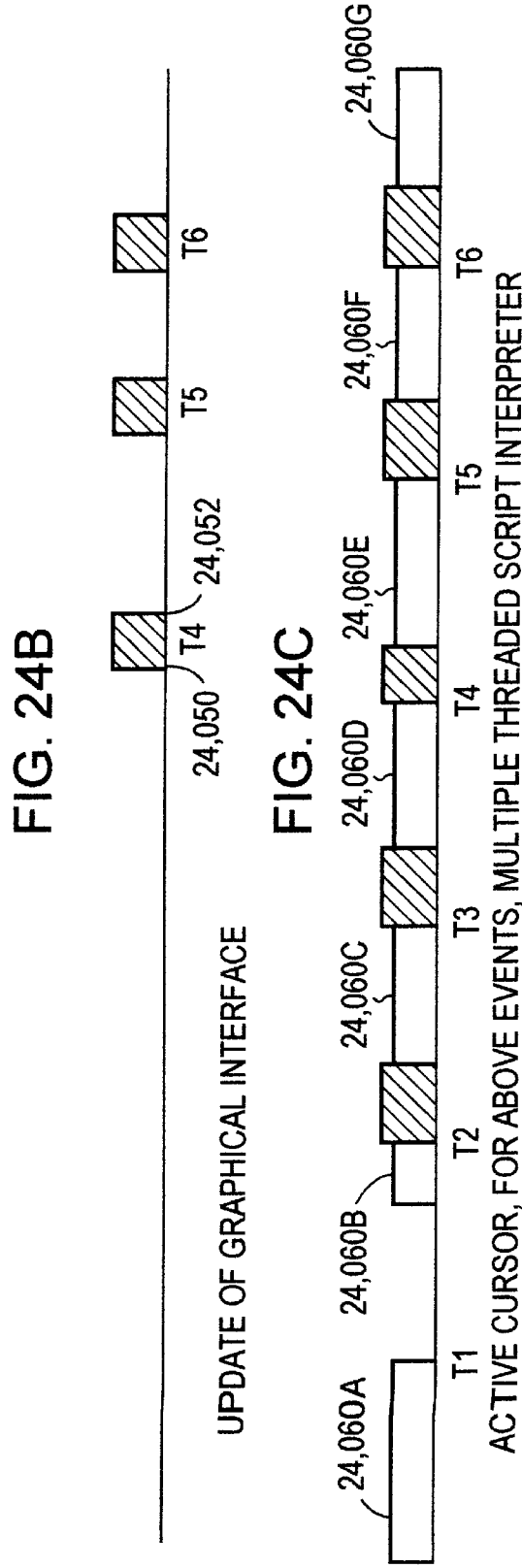
FIG. 24A
FIG. 24B
FIG. 24C
FIG. 24D

DOCUMENT DISPLAY SYSTEM USING A SCRIPTING LANGUAGE HAVING CONTAINER VARIABLES SETTING DOCUMENT ATTRIBUTES

This application is a continuation of application Ser. No. 08/122,995, filed on Dec. 27, 1993 abandoned.

FIELD OF THE INVENTION

The invention relates generally to office management and more specifically to the representation and manipulation of documents on a display device.

BACKGROUND

In working with documents on a document management system, it is desirable to have a flexible scripting language to control the documents. To accomplish this control, a scripting language must be capable of specific commands written by the user to manipulate documents or parts of documents. Such a scripting language can be complicated and difficult for the user to learn and use. There is a need for an easy, flexible scripting language to control documents on a computer.

Also, it is desirable to keep the system open to new commands at all times, that is, to have no "busy" cursor. This allows the user to work continuously without waiting around for the system to complete a given task. There is a need for a scripting language which allows multi-threaded execution so that there is no "busy" cursor.

SUMMARY

A document management apparatus has a scripting language which controls documents by setting the attributes of documents. Attributes are pieces of data within a document. A script engine reads a script from a cache memory and launches the processes to accomplish the desired action of the script. A scheduler controls the script engine and an active queue and a blocked queue in order to carry out multi-threaded execution.

These and other features and advantages of the present invention will become apparent from a reading of the detailed description in conjunction with the attached drawings in which like reference numerals refer to the elements in the several views.

BRIEF DESCRIPTION OF THE DRAWINGS

FIG. 20 is a field diagram of a request message;

FIG. 21 is a field diagram of a request queue entry;

FIG. 22 is a field diagram of a response message from a repository;

FIG. 23 is a field diagram of a response queue entry;

FIGS. 24A, 24B, 24C, 24D are timing diagrams showing operation of a document retrieval system;

DETAILED DESCRIPTION

Documents

Figure 1:
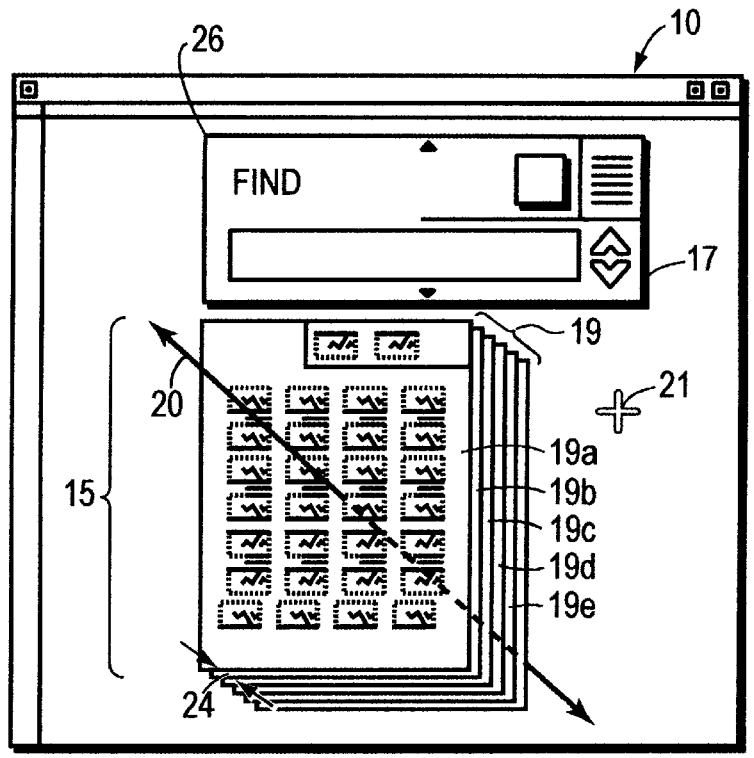
FIG. 1 is a drawing of a strand.

A document is the primary object in the system. All data are contained in documents. A document contains some number of attributes, each attribute having a name and a value. The set of attributes for any given document is arbitrary, and no particular attributes are required of all documents.

A screen object is the visual representation of a document. It may be visible or hidden at any given time. Screen objects are generally rectangular.

A Unique Identifier, or UID, is a string of alphanumerics that uniquely identifies a document. A UID is necessary and sufficient to refer to a specific document.

Attribute/Value Pairs

An attribute is a piece of data stored in a document. Each attribute has an attribute name and an attribute value. An attribute name uniquely identifies an attribute value within a document.

The Script Interpreter

Script consists of a scripting language that can be executed to perform some action. It is stored in attribute values. Scripting language is a language used to specify commands to the system environment.

The script interpreters (architecturally there can be any number) interpret script which is stored in attributes of documents. Scripts can modify attributes of documents, perform basic mathematical and search operations, call other scripts, and do other basic operations such as insert or remove documents from strands. Most of the actions in the system are activated by calling scripts within documents.

Documents are the single abstraction structure in the script language. There is no persistent storage associated with the script environment other than attributes of documents. Most of the actions in the system (other than simple dragging of documents) are activated by calling scripts within documents. A document consists of attribute/value pairs; by referencing an attribute in an expression, the value is returned.

The value of any attribute, ephemeral or not, may be executable script. Script thus allows the power user to extend the functionality of the system. For example, a user may define the value of an attribute by writing his or her own script as the value of that attribute.

Whether an attribute is executable or not is typically established by convention. For example, for a given implementation, an architecturally defined set of messages may indicate that the attributes referenced by the messages are executable. Or, a button on the mouse may be architecturally defined to invoke and execute the script contained in an attribute of the document in which the cursor is located when that button is clicked by the user. In addition, or as an alternative, an identifier process can be designed and used to determine whether the value of an attribute is script, and also what script interpreter is needed to interpret it. The identifier process does not test whether the script can be properly parsed, but upon determining that the value of an attribute is script, chooses which script interpreter to call to interpret the script. For example, the identifier process can select an interpreter for a dialect of the LISP programming language by checking the first non-whitespace character to see if it is a left parenthesis or single-quote. If the first non-whitespace character is a left parenthesis of a single-quote, the identifier process selects the interpreter for the dialect of the LISP programming language to interpret the script.

A goal in designing a particular script language is that the script language be easy to read. Users may not be computer scientists, but will nevertheless want to examine and modify scripts to a certain extent. Therefore the language must have a few special characters, and generally use natural language words instead of symbols.

The script language should be uniformly structured, in that the only storage entity (object) in the language is a document consisting of attribute/value pairs. Values may be atomic, such as strings, numbers, dates, or images, or they may be pointers (UID's) to other documents. Global objects may be stored as attributes in a universal "global" document which is visible to all scripts.

Attributes are generally not typed, but values are generally typed. The types of values are used to determine what operations are permissible. A script is executed within a document by evaluating an attribute whose value is a script, and whose type is executable.

Inputs to the System

An example embodiment of the system includes an input device, for example a mouse, to obtain information from the user regarding selecting and moving documents within the display. It will be clear to one skilled in the art of user interfaces that devices other than a mouse, such as a light pen, a voice controlled display, or a touch sensitive screen, are potential alternatives to the mouse.

The locations of mouse events, for example the pressing and or releasing of a mouse button, are recorded as the UID of the document in which the cursor is located when the mouse event occurs. The x, y or z position of the cursor at the time the mouse event occurred is recorded. The results of user actions to select or deselect one or more documents are similarly recorded.

Scanning Documents

Any paper document can be entered into the system by scanning. When scanning a document into the system, a cover sheet should be used. Each cover sheet is encoded with the identification of the owner of the document. Such identification would, for example, consist of the unique user name defined within the system used to log-on or gain access to system.

In an example embodiment, when a document is scanned into the system, the scanned document is automatically placed in an IN BOX pile of the owner of the document. Each scanned document has an information sticker across its top displaying the name of the owner and the date it was scanned. The cover sheet is not included.

Scanned documents without cover sheets, or that have cover sheets that do not name valid users, cannot be delivered to the true owner of the document by the system. The system may be configured to deliver such scanned documents to a designated user, who is responsible for determining the owner of the scanned documents.

The Visual Presentation: The Workspace

A workspace is a virtual three dimensional space in which a set of documents are arranged. In this way a workspace contains a set of documents. Within a workspace, there is a list of the documents contained within the workspace, consisting of combinations of repository identifiers (RIDs) and unique identifiers (UIDs). Also, for each document within the workspace there exist ephemeral attributes, which describe the current visual display of that document within the workspace. Examples of ephemeral attributes include the X, Y, and Z positions of the document within the workspace.

A workspace is stored in a workspace document and displayed in a workspace window. A workspace document is a document that contains all of the state information of a workspace. A workspace document may be contained within other workspaces.

The display of a workspace on the display device is the "screen space" representation of the three dimensional workspace on the two dimensional display device. In an embodiment of the system, the screen space display of a workspace is implemented through a window in the host computer's windowing system, within which the two dimensional screen space rendering of the three dimensional workspace is displayed.

The system uses a three dimensional workspace to provide a useful display of potentially thousands of documents. A workspace may display thousands of documents. In a preferred embodiment of a workspace, the workspace is wrapped at the edges, giving a fish-eye lens effect, so that every screen object that is not invisible has at least some portion of its rectangle within the screen display no matter what its position in the three dimensional workspace.

Workspaces may be shared, such that multiple users have the same workspace open. For example, user one and user two could simultaneously have the same workspace open. In one embodiment, when user one drags a document within the workspace, user two sees it moving as well. The ephemeral attributes defining the visual representation of the documents within the workspace can be mediated via repository connections from user one to user two to support this feature. For example, both user one and user two could simultaneously read and write to a shared copy of the workspace document within a mutually accessible repository. Alternatively, user one and user two could maintain separate copies of the workspace document in their respective client modules, establish a direct network connection between them, and exchange ephemeral attribute updates via the direct network connection.

The Renderer Process

A renderer process is an element of the system that maintains the virtual three dimensional workspace. The renderer process is performed by various specific renderers.

A document renderer is that portion of the system that draws inside the rectangle of the screen object associated with each document in a workspace. The system supports multiple renderers, and which renderer is used for a particular document is determined by an attribute of that document.

A workspace viewer is a process in the system responsible for outlining the screen objects of documents within the workspace and managing the display of selection indication. The interior of each screen object is rendered by its associated renderer, and the workspace viewer completes the view. The workspace viewer is also that part of the system which is responsible for maintaining the view of a workspace. That is, the workspace viewer contains the means for arranging documents in three-space.

Ephemeral Attributes

Ephemeral attributes are attributes associated with a document in the context of a workspace. Ephemeral attributes are stored within a workspace document of the workspace containing the screen object of the specific document which the ephemeral attributes are associated with. Ephemeral attributes define the display characteristics of the associated document, such as position and size. Ephemeral attributes reflect the actions of the user in manipulating the screen object of a document within a workspace, typically through using an interface device such as a mouse.

Ephemeral attributes are stored in workspace documents, which in turn are stored in repositories. The complete state of the last image of a workspace, including ephemeral attributes associated with each document in the display, is stored in the permanent attributes of a workspace document when that document is stored into a repository. Thus a document may have different ephemeral attributes and values when that document is associated with different workspaces.

An ephemeral document is a document that has existence only in a workspace. It has no permanent attributes, only ephemeral ones. In an alternative embodiment, ephemeral documents may be stored in a virtual "workspace repository", accessible only from its workspace, and may have permanent attributes in this context. In such an alternative embodiment, the state of the workspace repository is stored as an attribute of the workspace document.

An intrinsic ephemeral attribute, or intrinsic attribute, is a special ephemeral attribute that every document must have, which directly effects the display of the screen object. Examples include x position (xpos), y position (ypos) and z position (zpos). Many intrinsic attributes are available for direct manipulation through the user interface device.

The Perspective Function

A perspective function maps objects on the screen by taking the three dimensional workspace coordinates, or "world space coordinates", maintained by the workspace viewer, and mapping them into two-dimensional screen space positions.

For example, every document has a position in world space defined along the x, y, and z axis, and every document has a width and a height. When an image of the document is drawn on the display device, the perspective function takes those world space coordinates and size variables as input parameters, and determines the actual size and location on the display device, in "screen space coordinates", where the document is actually going to be drawn. The perspective function is instantiated by the workspace viewer process.

Dragging Along the X, Y or Z Axis

To move a document around a workspace, there are three basic actions: dragging around, pushing back/pulling forward, and clipping. Dragging a document is the act of moving the corresponding screen object for that document with respect to one or more of the x, y, and z axis of the workspace by manipulation of the user interface device.

To move a document within the workspace, the user uses the user interface device to place the mouse cursor near the center of screen object of the document. The user next presses and holds the mouse button while moving the mouse. As a result, the screen object disappears and is replaced by an outline of its shape (called a drag box). As the mouse is moved, the drag box follows. This is known as dragging. When the mouse button is released, the screen object reappears in its new position.

Documents are pushed back and pulled forward via a modified drag action, e.g. using a separate mouse button, or by first moving the mouse cursor close to a corner of the screen object of the document, and then pressing and holding a mouse button. As an alternative a track ball device may be used to manipulate the position of the mouse cursor. As the mouse cursor is moved toward the bottom of the screen, the screen object is dragged forward (towards the user) within the workspace. As the mouse cursor is moved toward the upper left corner of the screen instead of forward, the screen object is pushed back within the workspace. Note that as the screen object on the display device is being moved, the virtual location of the corresponding document maintained in the world space of the workspace viewer is being changed accordingly. Thus one can either say that the screen object is being moved, or that the document is being moved, and have the same meaning.

As a document is pulled forward, the document is moved towards the user along the z axis of the three dimensional workspace. The perspective process translates this movement of the object towards the user into a screen representation of the screen object for the document. As a result, the screen object for the document grows in size in its two dimensional screen space representation. Conversely, when a document is pushed back, the screen object for the document is made smaller.

A document can only be moved forward a certain distance. When it is as big as it will get, it is plastered against the workspace window and cannot be moved any closer.

The world space size of a screen object is the size of the screen object in the three dimensional space of the workspace. This is the object's real size opposed to the screen space size at which it appears on the screen display surface. Documents and elements of documents (e.g. buttons, text fields, etc.) all have world space sizes. Although dragging along the Z axis can make the world space size of documents very small, they will never be rendered at a size that is invisible to the user.

In the case of "corner dragging" in the Z dimension, any of the four corners of a document may be used to push or pull it. However, the document will move along somewhat different paths depending on which corner is used.

Repositories

A repository is a data store that contains documents. A workspace is generally used for short term storage of documents. For long-term storage, documents are kept in repositories. When a system tool brings documents into a workspace, it gets them from repositories. A Repository Identifier, or RID, is a string of alphanumerics that uniquely identifies a repository. RIDs are unique on the network. An RID is necessary and sufficient to refer to a repository. In an alternative embodiment RIDs are universally unique, and therefore permanently stable in a global environment where mobile computing is increasing significant. For purposes of example, such universally unique RIDs may be assigned through a central RID allocation system, similar to how 48 bit Ethernet physical layer addresses are centrally assigned to specific network controllers, to guarantee that there are no duplicates.

The computer network that the system is connected to may have one repository available or it may have many. Some repositories are generic places to put documents, while others may be specialized. For example, a machine that sends and receives documents as faxes over telephone lines can be a repository. The user may choose to maintain a private repository on the local computer. Most repositories are on remote machines and the system gets documents from them over the network. A repository may exist on the local file system. An embodiment of the system may run on a system with no disks. In that case, all repositories exist within remote network nodes.

The user may retrieve documents from many different repositories at the same time. Similarly, multiple users can connect to the same repository at once. A user of a document may put a document into a shared repository marked to the attention of other specified users. Each user may configure a special FIND tool (which serves as their IN BOX) that constantly watches the repositories for documents marked for their attention and brings them into their workspace. In this way, documents may be shared between users.

Repositories are visually represented in a workspace by a document called a repository portal. The user accesses a repository through the repository portal for that repository. A repository may be password protected, such that the user may have to enter a password into the portal document before using the repository.

Repositories may have special characteristics (unusual connection requirements, limited hours of availability, etc.) These are represented to the user on the portal document. Repository portals also have a visual indication of whether their repositories are currently available for use.

A repository server is a server that serves documents from a repository to a client and provides a search engine, and repository interface to process search requests described by attribute value pairs from the client system, and to search the repository using the search protocol specific to that repository.

Strands

Strands are a system for positioning screen objects in a three-dimensional workspace. Strands allow grouping of documents, so that they can be manipulated as groups. Strands are a method of applying constraints to the organization of screen objects in three dimensions.

A strand is associated with a first document (the "strand parent"), and constrains the location of a set of documents not containing the strand parent. A strand is a process that maps a (possibly discontinuous) line into 3 space. Each strand child has a position on the strand relative to the strand origin. A strand also has minimum and maximum constraints for the spacing of its children.

Strands are not containers, but rather are a mechanism for arranging screen objects without hiding them. A strand constrains the position of screen objects attached to the strand into a certain shape. The certain shape is indicated by a strand function. When the strand function is evaluated, its output defines a strand path. A pile is an example of a strand where all the documents attached to a strand are constrained to be next to each other in the shape of a pile.

The strand path is mathematically defined as a one-dimensional path through three dimensions, along which are displayed the screen objects of the child documents of the strand. Objects attached to a strand path appear to be indirectly connected, as do pearls on a strand of string. The strand function can be arbitrarily set so that it is oriented in any direction or is any complex line. It can be a complicated function like a bunch of line segments joined together, or it could be U-shaped or zigzag-shaped.

A pile of documents is a strand having a strand path defined by a function causing the strand to be oriented substantially parallel to the Z access of the display, that is, going straight back from the surface of the display device that is closest to the user. A "tile" of documents is a set of documents placed next to each other so that the complete contents of their current screen objects are showing. A tile is defined as a strand having a strand path substantially parallel to the glass of the screen. The strand mechanism itself is completely general. The user may define a corkscrew strand path to have documents spiraling back into infinity if so desired.

An example of a system tool having a strand is as follows. The FIND operation may be a tool having a pile for its output. The FIND command locates documents, and puts them into a pile below itself. The output pile is attached to the FIND tool. When the FIND tool is moved, the pile follows. The FIND tool will "let go" of a document if the document is clicked and dragged away from the pile.

A strand parent is a document to which a strand is attached. The strand path for that strand is defined relative to an origin point defined with respect to the strand parent. For example, the strand path could be relative to an origin in the upper left corner of the screen object for the strand parent. Minimum and maximum separation constraints, associated with the strand parent, define the spacing between any two child documents on the strand to be greater than the separation minimum and less than the separation maximum. The minimum and maximum separation constraints may for example be stored in the strand parent.

FIG. 1 shows a display device 10, including an example of a strand 15. The strand 15 is shown having child document screen objects 19*a*, 19*b* . . . 19*e*, and parent document screen object 17. The strand path is shown by line 20, and the mouse curser is shown by element 21. The separation of the child document screen objects 19 is shown at 24.

During operation of the system, with reference to the elements in FIG. 1, the strand path 20 is calculated by evaluating a strand function associated with strand parent represented by screen object 17. The exact orientation of the strand path 20 is determined with reference to an origin constraint associated with the strand parent screen object 17, for example, the upper left hand corner of the strand parent screen object 17 at point 26. The outputs of this evaluation are three dimensional coordinates that define the strand path 20 in the virtual representation maintained by the workspace viewer.

The child documents of the strand (corresponding to screen objects 19) are determined from a list of unique identifiers of the child documents associated with a strand parent document corresponding to screen object 17. The separation constraints associated with the strand parent document, indicating the minimum and maximum separation of child documents displayed along the strand path 20, are also evaluated. The output of these evaluations provides three dimensional coordinates defining the appearance and location of the child document screen objects 19 along the strand path 20.

The three dimensional coordinates are passed to a perspective process for translation into two dimensional screen space coordinates. The two dimensional screen space coordinates are used to display screen objects 19, representing child documents along the strand path 20, on the display device 10. The strand path 20 itself is not typically, but may be displayed on the display device. The separation 24 between the child documents cannot exceed the maximum separation constraint, and is not less than the minimum separation constraint associated with the strand parent document corresponding to screen object 17.

Strand parents may further include a knot constraint, defining points in the strand that divide the strand into sub-strands. Knot constraints may be arbitrarily defined, and are generally invisible to the user. For example, knot constraints may be used to subdivide the strand into two sub-parts so that the user has a pile of mail that has been read, and a pile of new mail, both within a single strand. Knots are used to keep those sub-strands (or sub-piles) separated.

Two applications for strands are presentation of documents in piles or tiles, and grouping documents. A strand is an object on the display device, and the user can pick up the strand by using the mouse to select the parent document of the strand. All of the strand's children are moved when the strand itself is moved. The system may be configured such that when the user selects a child document on the strand and moves it, the document is removed from the strand. In the alternative, the system can be configured such that moving any child document on the strand causes the entire strand and all other documents on the strand to move without removing the child document from the strand.

In the example shown in FIG. 1, the parent document corresponding to screen object 17 is a FIND tool. For example, the FIND tool may be used to locate documents containing a particular string of characters. When the FIND tool is used, the documents found to contain the string are displayed along the strand 15, in this case, a pile. The FIND tool is the parent of that strand. When the screen object for the FIND tool is moved on the display device, the pile is dragged with it.

Figure 2:
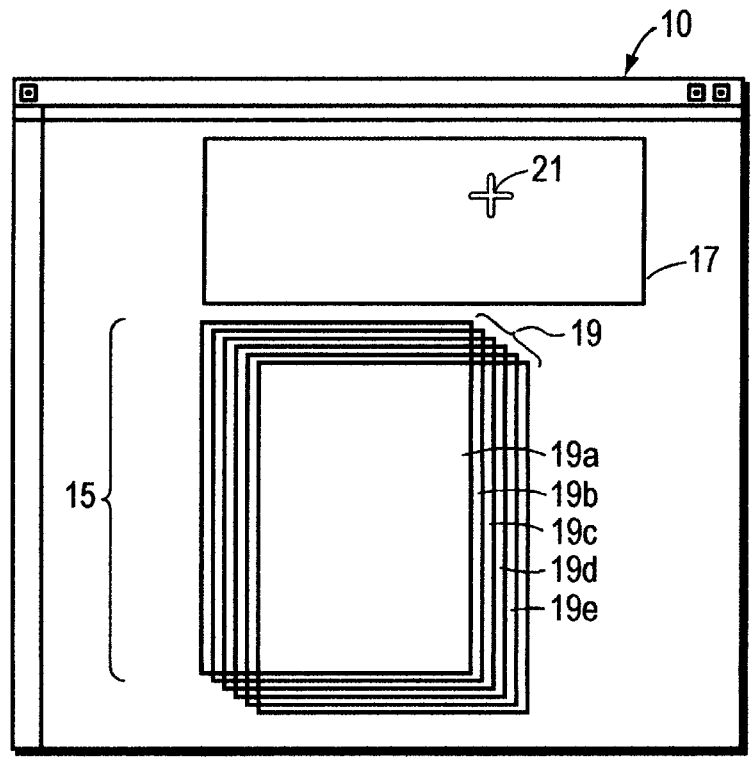
FIG. 2 is a drawing of a strand that has been selected by a user.

In FIG. 2, the elements shown in FIG. 1 are shown after the user has selected the screen object 17 of the strand parent for the strand 15. While the strand parent screen object 17 is selected, the user has also selected the entire strand 15, including child document screen objects 19. The strand parent screen object 17, and the child document screen objects 19 figure shown as outlines while the strand 15 is selected. Further, while the strand 15 is selected, the user may use the mouse to move the cursor 21 around the display device 10, thereby moving the entire strand 15.

After the strand 15 is moved to its desired position, the user may deselect the strand 15, causing the screen objects 17 and 19 for the strand parent and strand children to be filled in again.

In another example embodiment of a system tool using a strand, a pile and scroll tool is used to browse through a collection of documents. It uses a U-shaped strand that tiles a few of the documents and piles other of the collected of documents. The use of the U-shaped strand makes the use of the tool more intuitive for the user, since both the currently tiled documents are displayed simultaneously with the piled documents.

Figure 3:
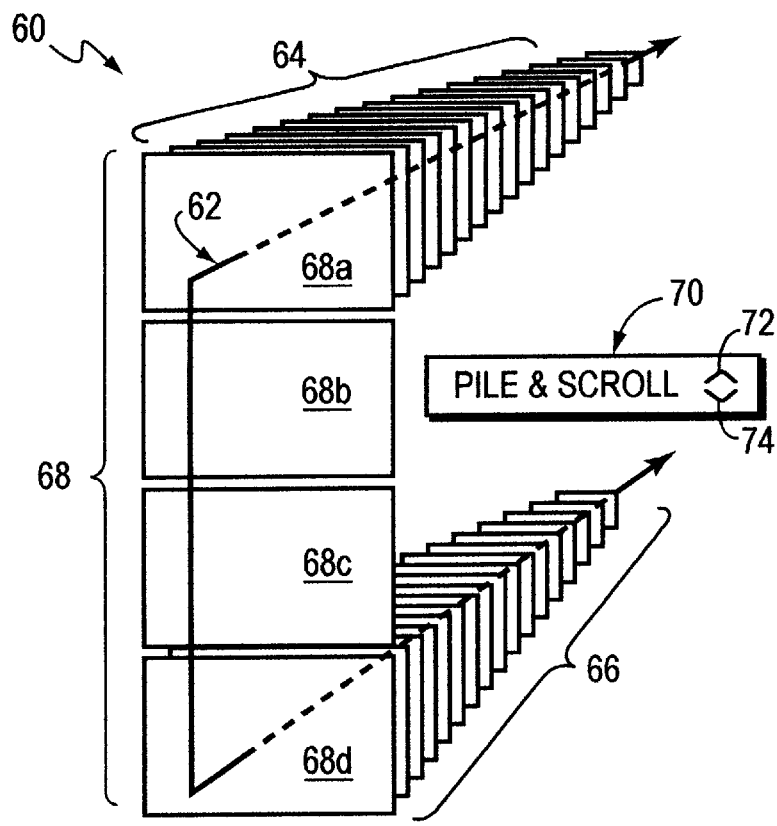
FIG. 3 is a drawing of a pile and scroll tool with a strand.

The pile and scroll tool 60 is shown in FIG. 3. Pile and scroll has a U-shaped strand function 62, including a first pile 64 and a second pile 66. In the configuration shown, first pile 64 in FIG. 3 is on top of a tiled section 68, and second pile 66 is on the bottom of the tiled section 68. The system allows other configurations and orientations of the strand. Documents 68a, 68b, 68c, and 68d, are shown in the tiled section between piles 64 and 66, and are tiled parallel to the screen.

The tile and scroll tool 60 in FIG. 3 has a control button 70, with up arrow 72 and down arrow 74. When the user brings the mouse cursor over up arrow 72 within the control button 70, and then clicks once on the mouse button, the tile and scroll tool 60 moves document 68a backwards into first pile 64, moves the documents 68b, 68c, and 68d upwards within the tiled documents 68, and brings forward a document from the second pile 66 to be displayed within the tiled section 68. If the user holds the mouse button down and does not release it while the mouse cursor is over the up arrow 72, multiple documents are continuously tiled into view from the second pile 66 until the mouse button is released.

Similarly, when the user moves the mouse cursor over the down arrow 74, and clicks once on the mouse button, a document is tiled into view from the first pile 64, and holding down the mouse button tiles multiple documents from first pile 64 until the mouse button is released. In this way, the user can browse through multiple collected documents using the pile and scroll tool 60.

In tiling, the documents look like they're beside each other, like pieces of paper on a table. They appear at the same distance from the user. Therefore, documents that are tiled are at the same Z position in the workspace, relative to the front of the display device.

Figure 4:
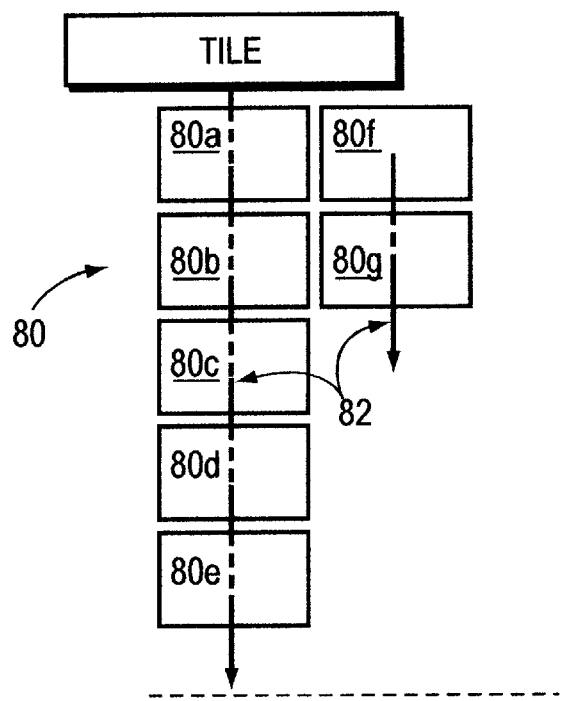
FIG. 4 is a drawing of a tile strand of documents.

In an example tile 80 shown in FIG. 4, the strand function 82 runs parallel to the screen, so that the documents 80a through 80g are threaded along the strand parallel to the screen. In a tile, the world space coordinates of the strand as maintained in three dimensions by the workspace viewer is parallel to the screen. In a pile, as shown above, the strand is not parallel, but perhaps perpendicular to the screen.

Figure 5:
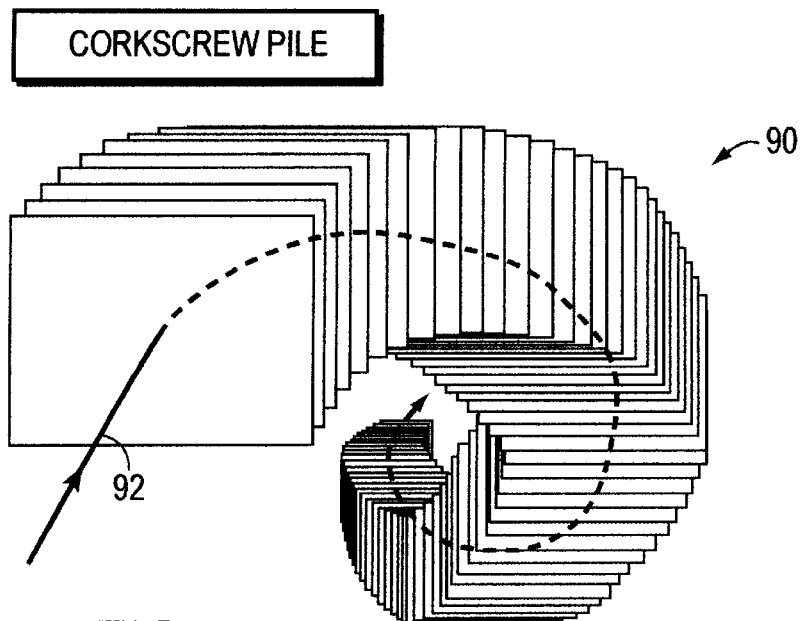
FIG. 5 is a drawing of a corkscrew strand of documents.

Thus it is seen that the strand function is an arbitrarily definable geometric function. An implementation may offer the user multiple pre-calculated strand functions, or an interface through which the user can define her own strand functions. As a further example of the flexibility of display provided by strands, FIG. 5 shows a corkscrew pile 90, having a strand function 92 defining a corkscrew shape.

Figure 6:
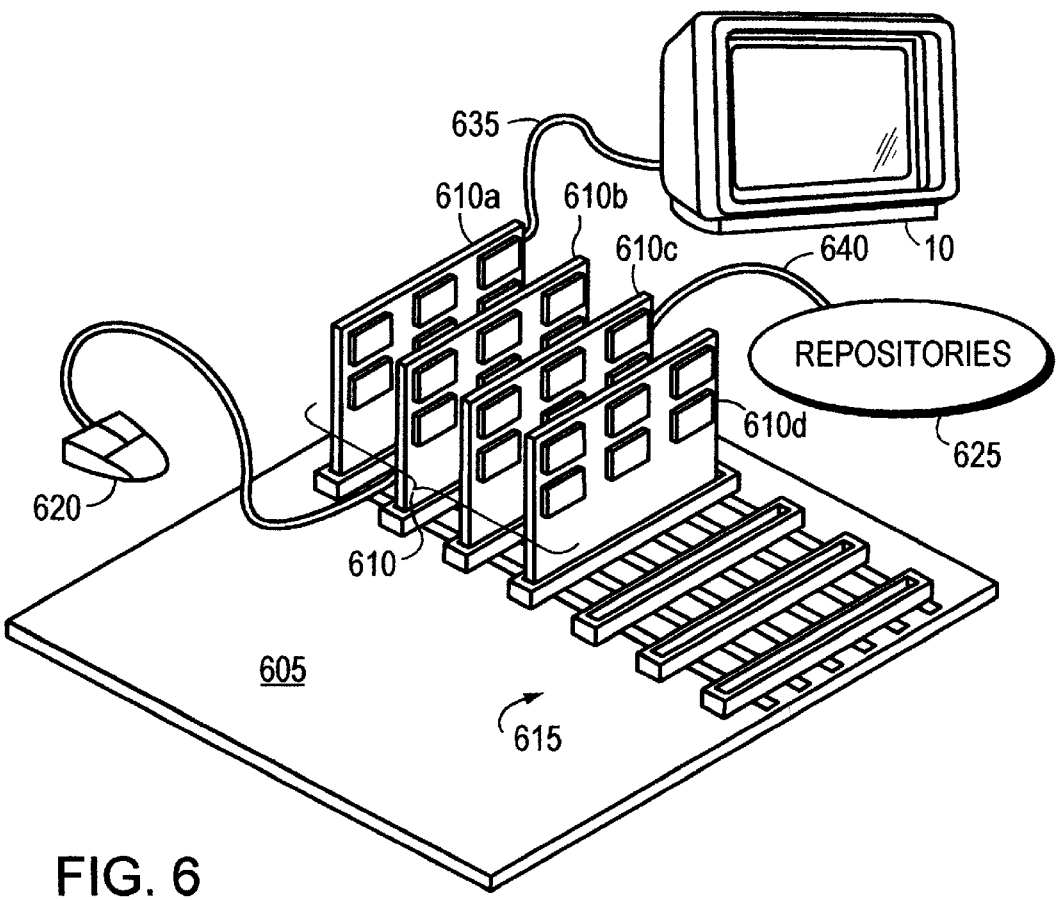
FIG. 6 is a drawing of an embodiment the system.

FIG. 6 shows an example embodiment of the document display system. A mother board 605 is shown having daughter boards 610, individually numbered 610a, 610b, 610c and 610d. The daughter boards 610 are coupled with the mother board 605 through parallel bus 615. Daughter board 610a, is coupled with a display device 10 through serial interconnect 635, daughter board 610b is coupled with user input device 620, and daughter board 610c is coupled with repositories 625 via network 640.

During operation of the elements in FIG. 6, the user manipulates the user input device 620, thereby sending user input commands to the daughter board 610a. The logic within the daughter boards 610 then responds to the user commands by changing the view on the display device 10, and requesting and retrieving documents from the repositories 625.

Figure 7:
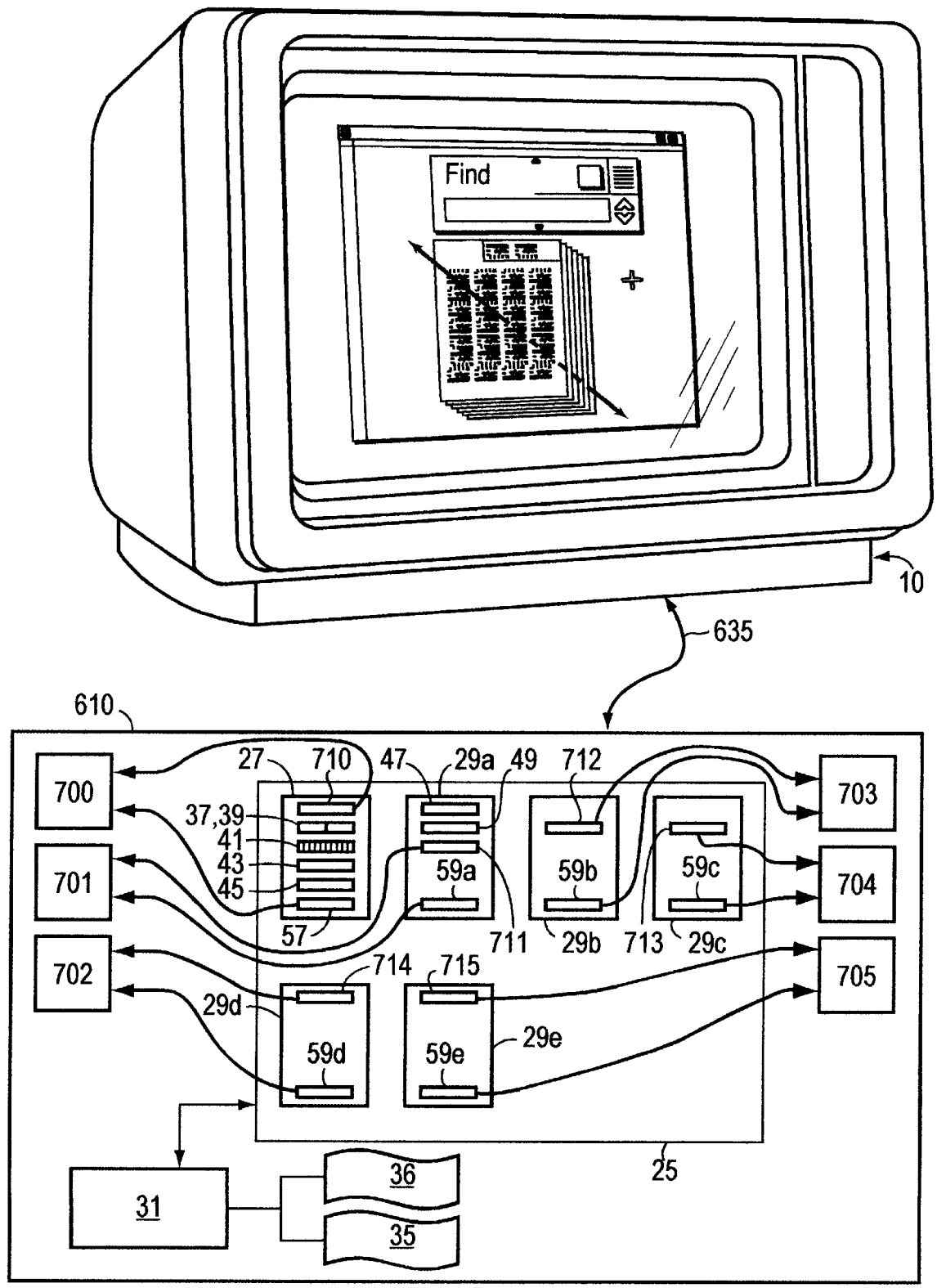
FIG. 7 is a drawing of a second embodiment of the system.

FIG. 7 shows elements in an example embodiment of the system. A display device 10 is shown displaying the example from FIG. 1. The display device 10 is coupled with a display controller 610 through serial interconnect 635.

The display controller 610 includes a memory 25, the memory 25 having parent document 27 (shown as screen object 17 in FIGS. 1 and 2), and child documents 29a, 29b, . . . 29e (shown as screen objects 19 in FIGS. 1 and 2). Parent document 27 includes minimum and maximum separation constraints 37 and 39 respectively, child document list 41, containing the unique identifiers for the child documents 29, strand origin constraint 43 and strand function constraint 45. The child documents 29 each contain parent pointer 47, containing the unique identifier of the parent document 27, and flags field 49, containing flags indicating whether the child may be removed from the strand when selected, and whether the child is to be displayed or concealed when the strand is displayed.

Also shown in FIG. 7 are processor 31, coupled with memory 25, as well as workspace viewer 35, and script engine 36. Script engine 36 and workspace viewer 35 are shown as processes running on processor 31, but it will be evident to one of skill in the art of computer science that these processes could alternatively be implemented in hardware, such as an application specific integrated circuit, or in firmware or microcode.

Also contained within each document is a document renderer attribute for that document. For example, parent document 27 contains document renderer attribute 57, and child documents 29a through 29e contain document renderer attributes 59a through 59e. The value of the document renderer attribute for each document indicates the document renderer for that document. In the example of FIG. 7, renderer attribute 57 indicates a document renderer 700, renderer attribute 59a indicates a renderer 701, and renderer attribute 59b indicates a renderer 703. Further, renderer attribute 59c indicates a renderer 704, renderer attribute 59d indicates a renderer 702, and renderer attribute 59e indicates a renderer 705. Thus in the example of FIG. 7 each document indicates a potentially different document renderer.

Each document may optionally contain a layout attribute, having a value equal to a script used to control the document renderer for that document. The script within the value of each layout attribute is capable of being interpreted by a script engine within the system, for example the script engine 36. In the example of FIG. 7, parent document 27 contains a layout attribute 710, for controlling the renderer 700, child document 29a contains a layout attribute 711 for controlling the renderer 701, child document 29b contains a layout attribute 712 for controlling the renderer 703, child document 29c contains a layout attribute 713 for controlling the renderer 704, child document 29d contains a layout attribute 714 for controlling the renderer 702, and child document 29e contains a layout attribute 715 for controlling the renderer 705.

Now with reference to the elements of FIG. 7, operation of the system is described. The workspace viewer 35 uses constraints from the strand parent document 27 to create three dimensional world space representation of the strand 15. The workspace viewer 35 maintains the current view to be displayed on the display device 10, including outlines of those documents currently displayed, and information defining which documents are currently selected. The document renderer attributes 57 and 59a through 59e indicate the document renderers 700 through 705 to be used to fill in the screen objects of those documents currently displayed on the display device 10. The workspace viewer 35 contains a perspective function to translate between three dimensional workspace coordinates and two dimensional screen space coordinates.

In a preferred implementation, document renderers 700 through 705 are implemented in an efficient programming language such as C, and controlled during execution by a script language contained in the values of layout attributes 710 through 715. The script in the values of layout attributes 710 through 715 is interpreted by the script engine 36. The primary task of the script language in this context is to set the values of attributes within documents. The script language therefore requires few verbs, as the values of a pre-defined set of attributes, known as intrinsic attributes, are used to control associated functions in the renderers 700 through 705.

The strand function 45 within strand parent 27 is a mathematical equation defining the strand path. The workspace viewer 35 processes the strand function 45 to obtain three space coordinates for the strand path 20 of the strand 15. The workspace viewer 35 inputs the strand origin constraint 43 to adjust the actual orientation of the strand path 20 relative to the upper left hand corner 20 of the screen object 17 of the strand parent 27.

The workspace viewer 35 inputs the child document list 41 and the minimum and maximum spacing constraints 37 and 39 to create world space three dimensional coordinates for the child documents along the strand path 20. The workspace viewer 35 passes the world space coordinates of the child documents 29 through a perspective process, which converts the three dimensional coordinates into two dimensional screen space coordinates. The workspace viewer 35 then sends the resulting screen space display through serial interconnect 635 to display device 10, causing the outlines of the screen objects of strand 15 to be displayed.

The layout attributes 710 through 715 are interpreted by the script engine 36. The system allows use of multiple script engines, and a document may either contain indication of which specific script engine to use to interpret the layout attribute for that document and thus control the document renderer for that document.

Figure 8A:
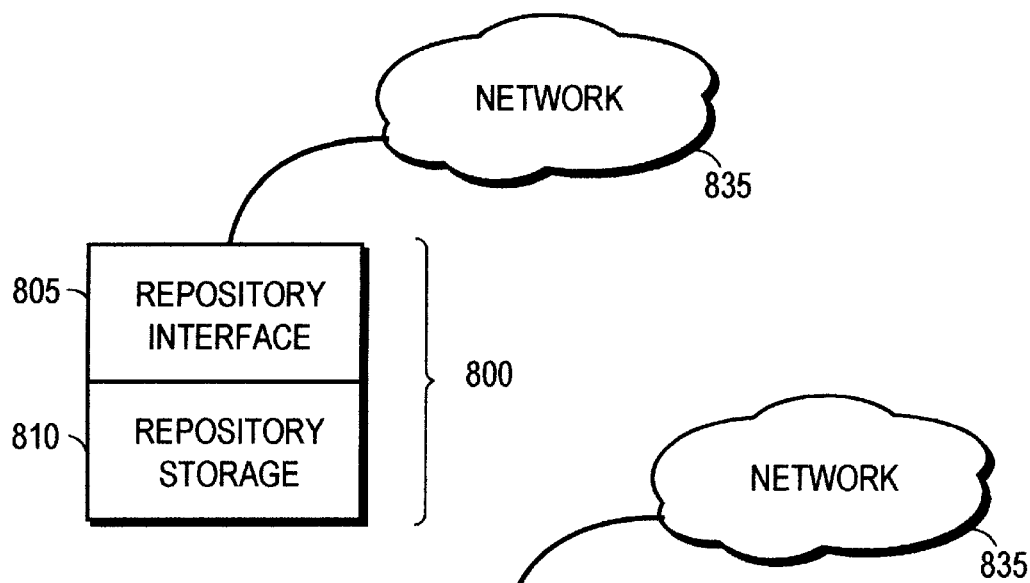
FIGS. 8A, 8B and 8C show repository interfaces.
Figure 8B:
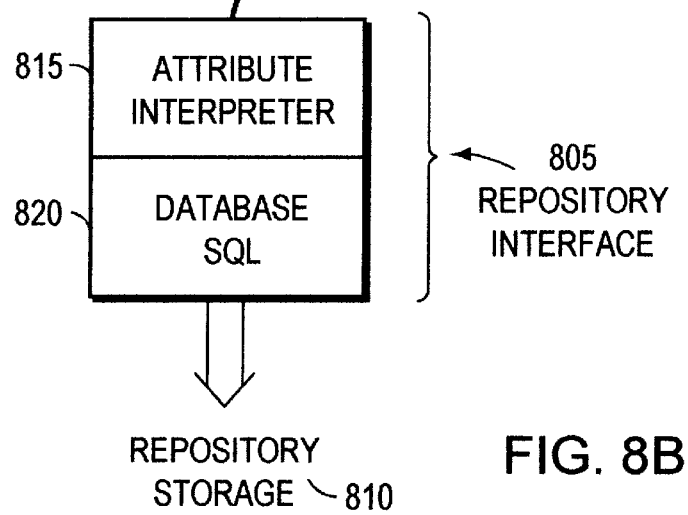
Figure 8C:
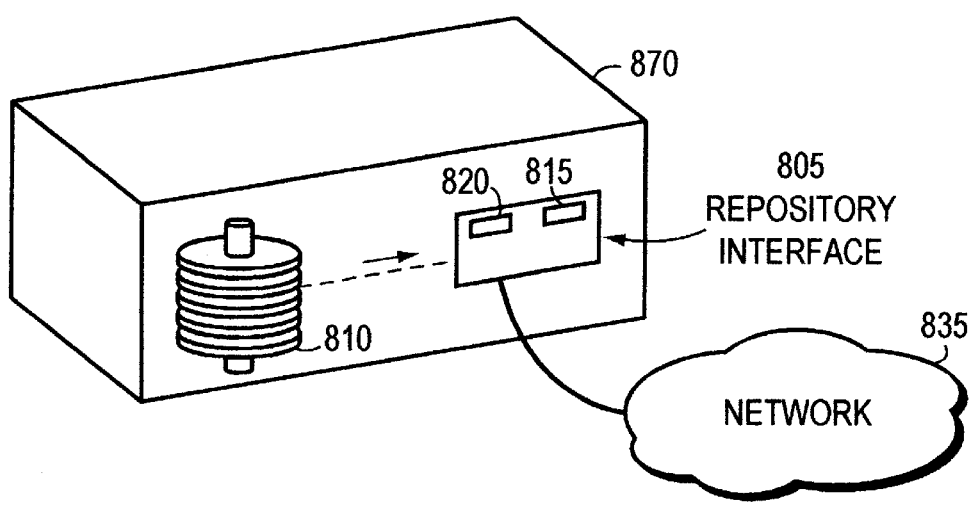

FIGS. 8a through 8c show an embodiment of a repository node 800. In FIG. 8A, the repository node 800 consists of a repository interface 805 coupled with a repository storage 810. During operation, the repository interface 805 receives repository requests from a client on a network 835. The repository interface 805 interprets the repository requests, and returns data from the repository storage 810.

FIG. 8B shows the logical processes within the repository interface 805. The repository interface 805 is shown to include an attribute interpreter process 815, coupled to a database standard query language (SQL) library 820. During operation, the attribute interpreter process 815 receives repository requests from the network 835, and translates the repository requests into database SQL commands, which are passed to the database SQL library 820. The database SQL library 820 returns the results of the commands issued by the attribute interpreter process 815, and the attribute interpreter process 815 then responds to the repository requests over the network 835. In this way, the attribute interpreter process 815 translates between the protocol of requests based on attribute having names and values, and the database SQL. Repository requests therefore may be based on attributes having names and values, independent of the type of search language used within the individual repository.

FIG. 8c shows a repository node 870, having repository storage in the form of a disc drive 810, and also having a repository interface 805. The repository interface 805 is coupled with the disc drive 810, as well as the network 835. The repository interface 805 includes the attribute interpreter process 815, as well as the database SQL library 820.

During operation of the elements in FIG. 8c, the repository interface 805 receives repository requests over the network 835. The repository requests refer to documents in terms of attributes having names and values. The attribute interpreter process 815 translates the repository requests into calls to functions in the database SQL library 820. The database SQL library 820 functions return information stored on discs within the disc drive 810. The attribute interpreter process 815 then responds to the repository requests with the information returned by the database SQL library 820, formatting the responses into attribute value pairs.

Figure 9:
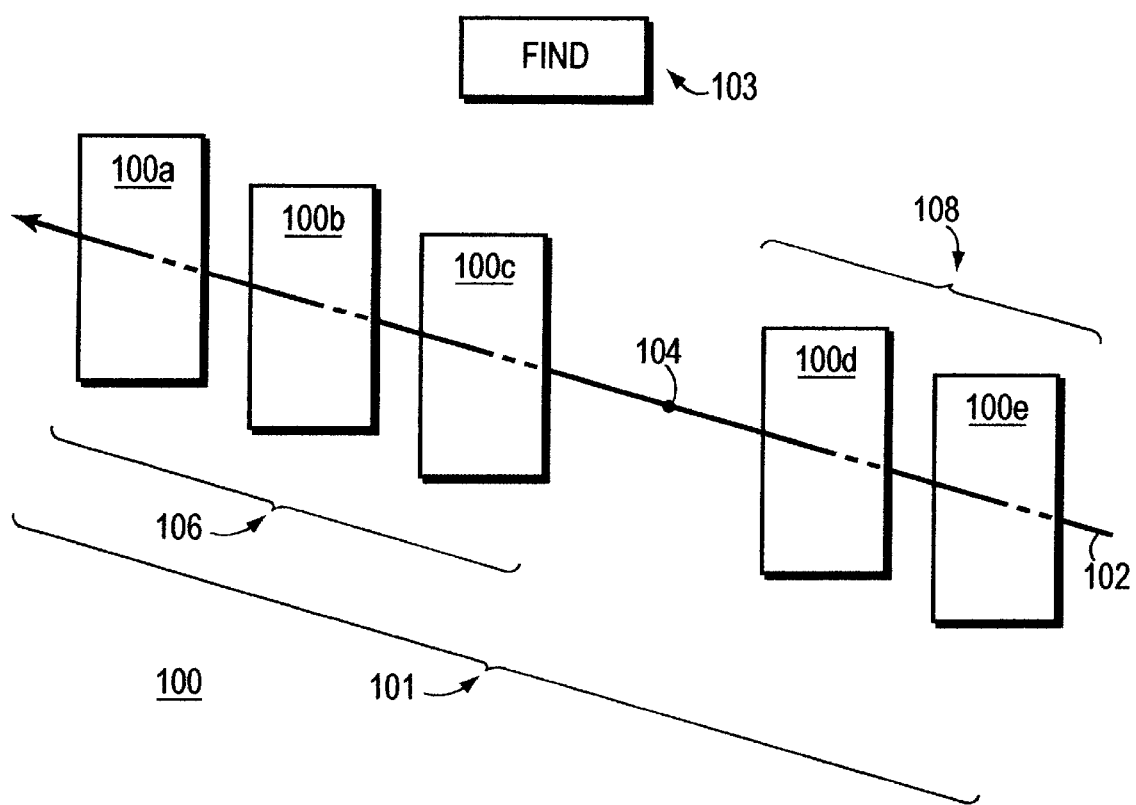
FIG. 9 is a drawing of a find tool with an output strand having a knot.

A strand may be defined having one or more knots that divide the strand into substrands. FIG. 9 shows a find tool 100 having an output strand 101, the output strand 101 having parent find tool document 103, and child documents 100a, 100b, 100c, 100d, and 100e. The output strand 101 further is shown having a knot 104, the knot 104 dividing the output strand 101 into a first substrand 106 and a second substrand 108. The first substrand 106 contains child documents 100a, 100b, and 100c, and second substrand 108 contains child documents 100d, and 100e.

During the operation of the elements shown in FIG. 9, the user activates the find tool 100 to search for needed documents, for example, those mail messages received from a given sender. The user also specifies a grouping for the find tool to use, for example all such mail messages previously read versus those not yet read. The user specifies that previously read documents be displayed in the background of the display relative to documents not yet read. The find tool 100 then locates those mail messages received from the specified sender.

The find tool 100 puts the unread mail messages received from the specified sender in the foreground of the output strand 101, followed by knot 104. Therefore, in the example of FIG. 9, the child documents 100a, 100b, and 100c are mail messages received from the specified sender, that are not yet read. The find tool 100 puts those mail messages received from the specified sender that have been read after the knot 104, in substrand 108. Thus, child documents 100d and 100e are mail messages from the specified sender that have previously been read.

As an alternative, the user requests that all mail messages received after a specified date be grouped in the foreground, and all others in the background. The knot 104 divides the two requested groups, and child documents 100a, 100b and 100c, in substrand 106, are those mail messages received after the specified date, and child documents 100d and 100e, in substrand 108, are those received prior to the specified date.

Sliding

Sliding is the direct manipulation mechanism for changing a strand child's strand position. Other children of the strand may be rearranged to satisfy the constraints of the strand.

A document may be moved along a strand through sliding, just like sliding a bead along a string. When the user slides a document on strand, other documents on the strand move as well, either pulling behind or pushing ahead of the sliding document. For example, if the strand max constraint is set, other documents follow along the sliding document such that the max constraint isn't violated.

Sliding may be either a user driven event, or script driven event. A user may slide a document by selecting the document with the cursor or other user interface device, and then directly changing the position of the document on the strand. Sliding may also be done when script is executed, for example as a result of execution of an attribute having script as a value.

The minimum and maximum separation constraints are evaluated such that a line in between the two documents in three space, in between the closest two points of the documents in three space, is guaranteed to be of greater length than the strand min and less than the strand max.

A document can be removed from the strand or inserted onto the strand. Both of those operations cause the constraints of the entire strand to be recomputed, resulting in other documents be repositioned on the strand if the constraints are no longer satisfied. When a document is moved, the spacing constraints are re-evaluated. If the spacing constraints are no longer satisfied, the changes are propagated to all of the documents to make sure that the documents are positioned in a way that causes the constraints to be satisfied. In an implementation of strands using knots, there may result a situation where it is impossible for all of the constraints to be satisfied. That is, there might be two knots and so many documents between them that the minimum distance constraint could not be satisfied. Under those circumstances the strand would spread the discrepancy out equally among all the documents on the effected strand or substrand.

Components in an Example Embodiment of the System

Figure 10:
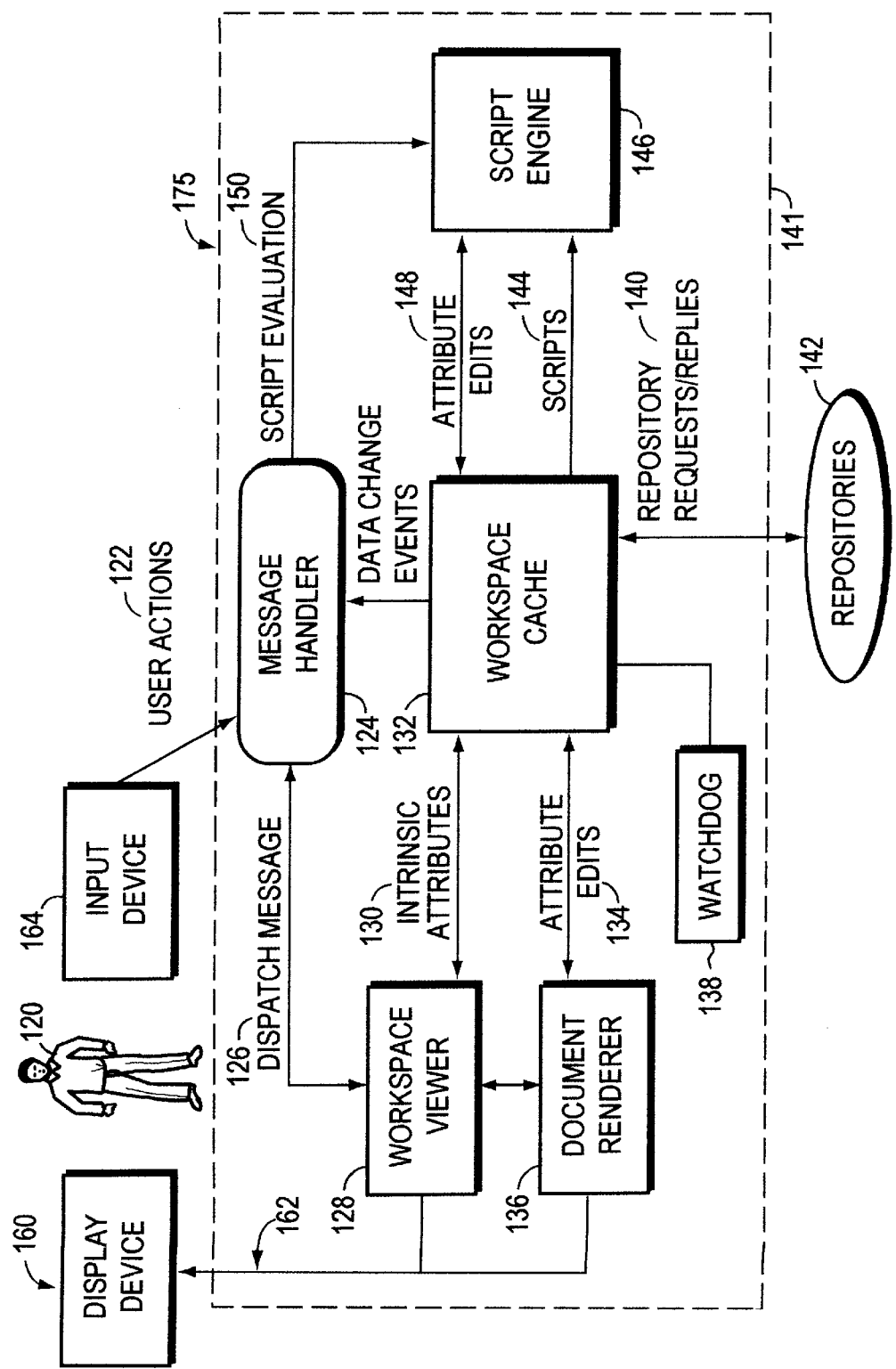
FIG. 10 is a block diagram of the architecture of a document display system using strands.

FIG. 10 is a block diagram of the architecture of a document display system. A user 120 interfaces with an input device 164, for example a mouse and/or a keyboard, to detect user actions 122. A message handler 124 is shown responsive to user actions 122. Message handler 124 is further coupled with a workspace viewer 128, such that message handler 124 sends and receives dispatch messages 126 to and from workspace viewer 128. The workspace viewer 128 is also coupled with a workspace cache 132, such that the message handler 124 can receive data change events from the workspace cache 132. The workspace viewer 124 is coupled with a script engine 146, such that script engine 146 performs script evaluation 150 for the message handler 124.

The workspace cache 132 is coupled with repositories 142, and sends repository requests 140 and receives repository replies 141. The workspace cache 132 is further coupled with the workspace viewer 128, and the workspace viewer 128 is capable of reading and writing intrinsic attributes 130 in the workspace cache 132. The workspace cache 132 is also coupled with a document renderer 136, and the document renderer 136 performs attribute edits 134 on attributes within the workspace cache 132. The workspace viewer 128 and the document renderer 136 are coupled with a display device 160, by means of screen update operations 162. Also, the workspace cache 132 is coupled with a watchdog process 138, and the script engine 146. The script engine 146 is capable of performing attribute edits 148 on attributes stored within the workspace cache 132. Those components within the dotted line 175 are core elements of the system.

The interaction of the elements in FIG. 10 is now described. The message handler 124 coordinates the computation necessary to execute scripts in the script engine 146, read and write data into the repositories 142, and keep the workspace on the screen consistent with data and user actions 122. The message handler 124 translates user actions 122 into messages that are dispatched 126 to the workspace viewer 128.

The workspace viewer 128 manipulates screen objects in three dimensions and allows direct manipulation by the user 120. The workspace viewer 128 manipulates attributes stored in the workspace cache 132, that are from documents stored in the repositories 142. The workspace viewer 128 displays data (attributes) that are stored in a workspace document as well as attributes of other documents referenced by the workspace viewer 128. A workspace document contains references to other documents and when opened displays screen objects that display data (attributes) contained within the referenced documents. Approximately there is one screen object per document reference.

Intrinsic attributes 130 are those attributes that each document has in workspace cache 123 while it is being referenced by a workspace document. An example of an intrinsic attribute is the "X" position of a document's screen object within the workspace window. Intrinsic attributes are sufficient to outline the screen object for a document.

The system maintains an asynchronous connection with any repositories 142 that it needs to access, and makes requests to the repository for any information needed to complete the current display. Repository requests are handled by an asynchronous remote procedure call mechanism.

The workspace viewer 128 operates on data contained in the workspace cache 132, from a workspace document. The workspace viewer 128 maps attributes for each document referenced by the workspace document into the outline of a screen object that is associated with that document.

For example, in an implementation of workspace viewer 128, the position of a document on the screen is affected by changing the intrinsic attributes corresponding to the x position, y position, and z position of the document in the context of the current arrangement of the workspace document. Similarly, a direct manipulation by the user 120 of the screen position of a document changes the intrinsic attributes of that document.

The inside of the screen object for each document is rendered by a document renderer 136. The workspace viewer 128 maintains the locations of the screen objects within the workspace, draws the outline of the screen objects, and then negotiates with the document renderer 136 to fill in each document. The document renderer 136 draws appropriate data inside the documents based on attributes of the documents. Each document may indicate its own document renderer 136, based on the value of a document renderer attribute within the document. Both the workspace viewer 128 and the document renderer 136 interpret user-manipulation messages that are directed at screen objects in the current arrangement of the workspace document being displayed.

The script engine 146 executes script written in a system compatible scripting language. Script is executed in the context of the workspace in which it was initiated, and is able to read, write, and search all attributes of documents in the workspace as well as add and delete document references from the workspace, and perform repository specific actions.

A further example of the operation of the example system in FIG. 10 is now described. The user 120 initiates a user action 122, which is detected by the message handler 124. The message handler 124 then executes script using the script engine 146, and dispatches a message 126 to the workspace viewer 128, thus translating the original user action 122 into a command, or instruction for the workspace viewer 128.

The workspace viewer 128 receives the message 126 from the message handler 124, and reads those intrinsic attributes 130 effected by the user action 122, from the workspace cache 132, and recalculates those attributes in the context of the three dimensional workspace. The workspace viewer 128 then writes the recalculated intrinsic attributes 130 to the workspace cache 132.

The document renderer 136 is signaled to update the screen display for each document by either a periodic watchdog process 138, or by a signal from the workspace cache 132 indicating that attributes within the workspace cache 132 have been modified.

Figure 11:
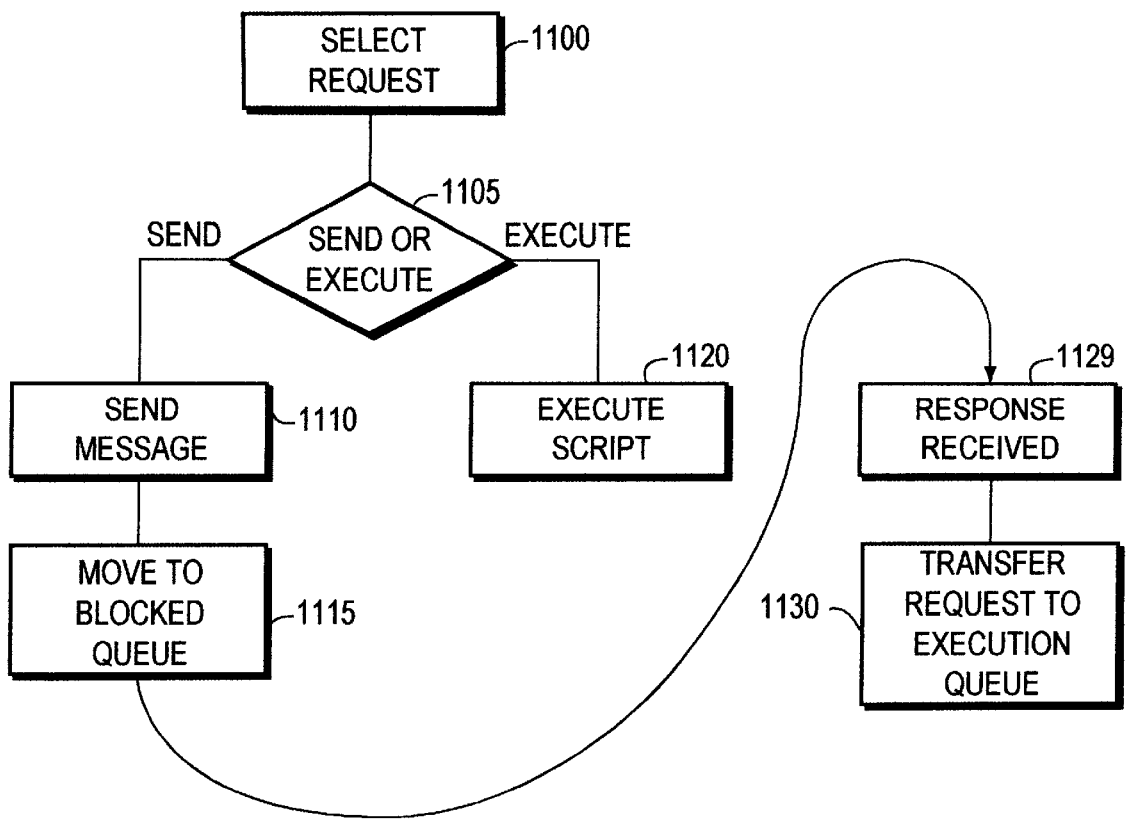
FIG. 11 is a flow chart showing the steps of a method for scheduling using a blocked queue and an execution queue.

FIG. 11 is a flow diagram of steps performed by the message handler 124 to handle events requiring script execution. In step 1100, the message handler receives a request indicating an event has occurred requiring script execution. Next, step 1105, the message handler 124 determines whether the script to be executed requires data from a repository. If the script does require data from a repository, the message handler 124 sends a message in step 1110 to the repository requesting the data, and puts the script to be executed onto a blocked queue in step 1115. If the script to be executed can be executed without data being retrieved from a repository, the message handler 124 causes the script to be placed into an execution queue in step 1120, to be interpreted by the script interpreter and executed. When a response is received in step 1125 from the repository having data needed to execute script placed on the blocked queue in step 1115, the next step is step 1130. In step 1130, the script previously moved to the blocked queue in step 1115 is moved to the execution queue.

The Attribute Format

Figure 12A:
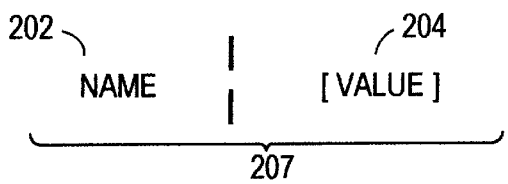
FIGS. 12a and 12b are diagrams showing two embodiments of the attribute format.
Figure 12B:
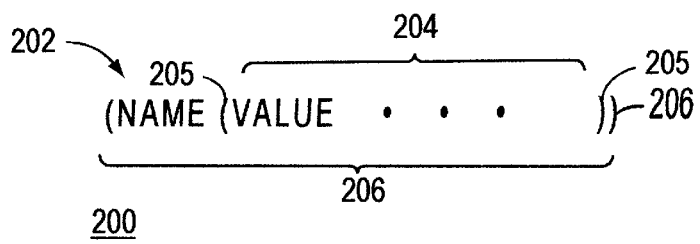

FIG. 12 is a diagram of an embodiment of the format of an attribute. In FIG. 12a, a first embodiment of an attribute 207 is shown having a name 202, a delimiter 203, and a value 204. In FIG. 12b, a second embodiment of an attribute 206 is shown having a name 202, and a value 204 delimited by parenthesis 205. The name 202 and the value 204 are grouped together in a list, delimited by outer parenthesis 206. In list processing languages, core operations are available to extract the first element of the list, in this case accessing the name 202 part of the attribute, and also to extract or evaluate the remainder of the list other than the first element, in this case the value 204 of the attribute. The value 204 of the attribute may consist of script language, and when evaluated or referenced may be interpreted by the script engine.

Scheduling Repository Requests

Figure 13:
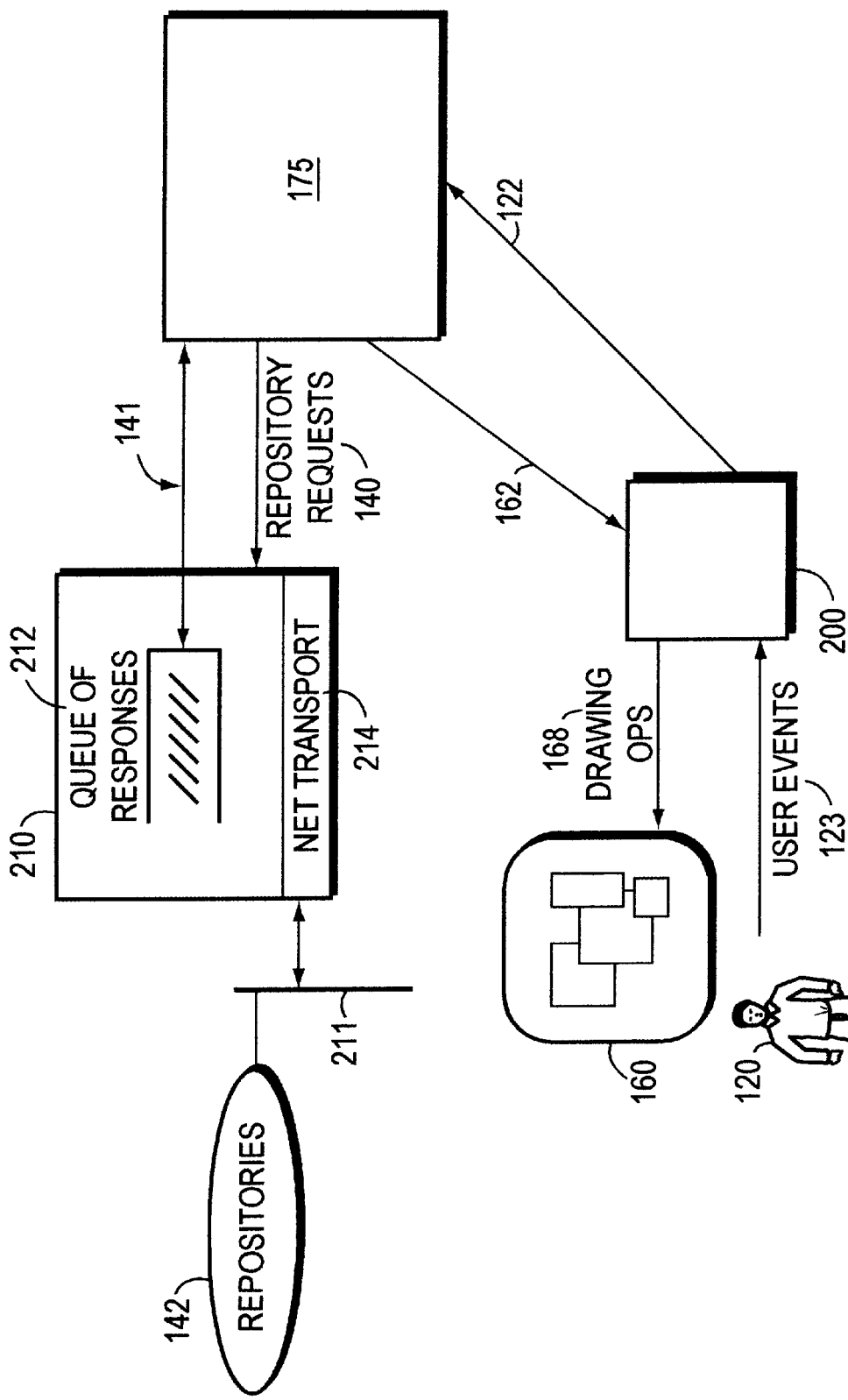
FIG. 13 is a diagram of showing a system having asynchronous remote repository access.

FIG. 13 is a diagram of an embodiment of the system having remote repository access. The core elements 175 of the system (as shown in FIG. 10), are shown coupled to windowing system interface module 200. The interface module 200 is coupled with the display device 160, and also detects user events 123 from a user 120. User events 123 are translated into user actions 122 as understood by the core elements 175. The interface module 200 receives screen update operations 162, and translates the screen update operations into drawing operations 163 specific to the individual windowing system for the implementation. The interface module 200 is responsible for drawing on the display surface of the display device 160 and providing all user interaction events to the core elements 175.

A client module 210 is shown coupled with a LAN 211, the LAN 211 in turn coupled with repositories 142. The client module 210 includes a network transport layer module 214, and a queue of responses 212. The core elements 175 are coupled with the client module 210, receiving repository replies 141, and issuing repository requests 140.

During operation of the elements in FIG. 13, the client module 210 deals with the interactions with the repositories 142. The client module 210 supports making connections and asynchronous requests for data from the repositories 142. Responses are placed in the queue of responses 212. When the core elements 175 issue a repository requests 140, the client module 200 calls the network transport layer module 214 to send a request message over the LAN 211 to the repositories 142. When a response is received from the repositories 142 over the LAN 211 by the network transport layer module 214, the client module 210 puts the response into the queue of responses 212. The core elements 175 eventually dequeue the response from the queue of responses 212. In this way, multiple repository requests 140 may be simultaneously outstanding, responses from the repositories 142 may be received asynchronously, and the responses may be dequeued from the queue of responses 212 as is convenient for scheduling by the core elements 175.

A Method for Retrieving and Displaying Document Information from Repositories

Figure 14:
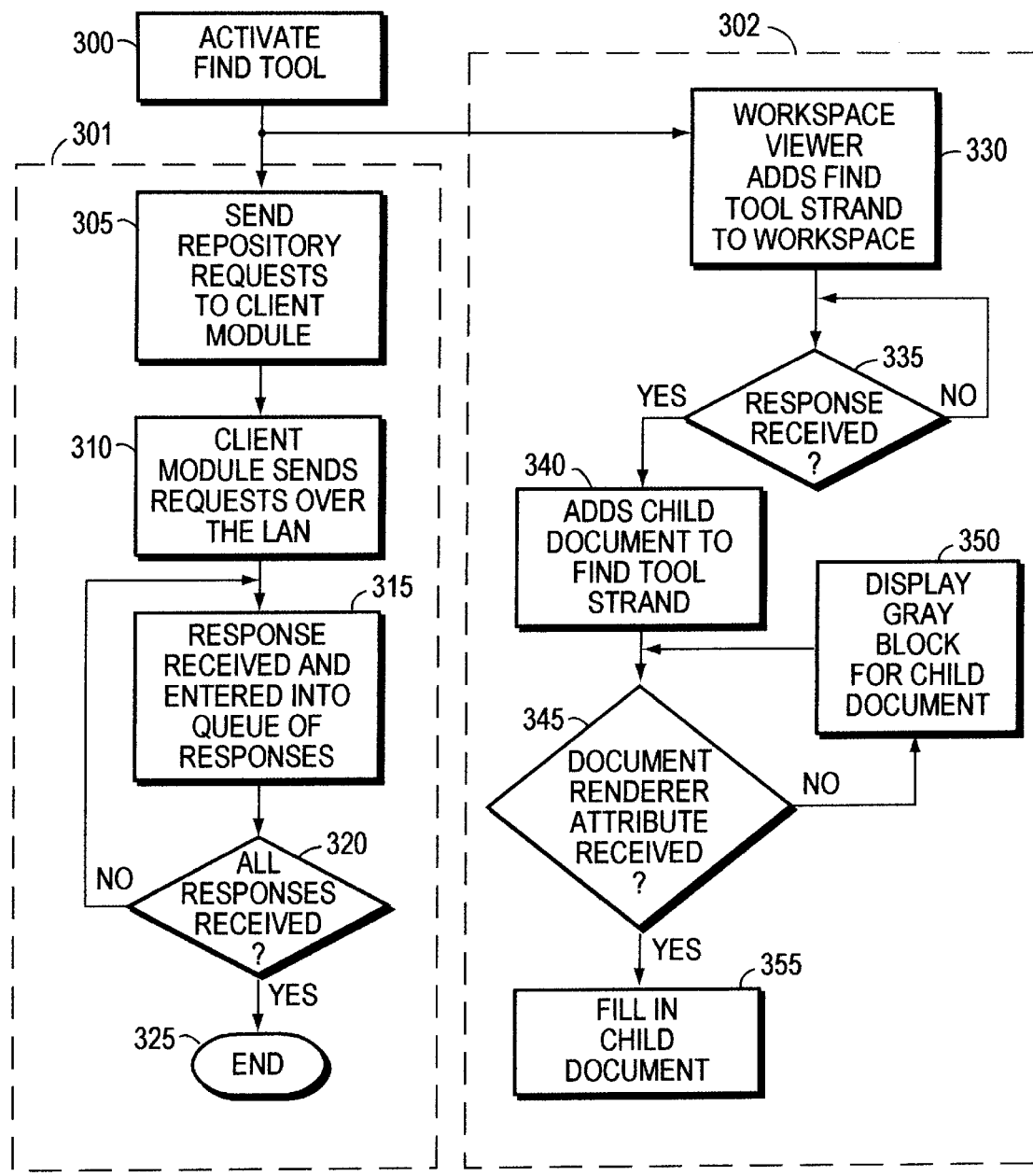
FIG. 14 is a diagram showing the steps of a find tool method for retrieving documents from repositories.

FIG. 14 is a flow chart showing the steps of a method for retrieving attributes from repositories. In step 300 a FIND tool is activated to assemble files matching a given set of parameters into a strand. For example of a given set of parameters, the user could request the FIND tool to retrieve all files with a given extension, or a of a common file type. The find tool starts a first process 301, having steps 305, 310, 315, 320, and 325. In step 305, the find tool sends repository requests to a client module, requesting the client module to obtain files from all repositories matching the given set of parameters. In step 310, the client module sends requests over a LAN to the repositories, for files matching the given set of parameters.

As each repository receives the requests sent by the client module, the repository processes the request and issues a response for any files matching the given set of parameters. In step 315, the client module receives a response from one of the repositories, and enters the response into the queue for responses within the client module. Responses from the repositories may be received in any order.

Decision block 320 determines whether all the needed responses have been received. This may be implemented either through a timer mechanism, or by requiring all repositories to respond whether or not they contain files that match the given set of parameters. When all the responses are received from the repositories, decision block 320 terminates the first process 301 in end state 325.

Second process 302 executes independently from, and in parallel with first process 301. After the FIND tool is activated in step 300, in step 330 the workspace viewer adds the FIND tool strand to the workspace. Until responses are received from the repositories, the FIND tool strand will contain no documents. While the FIND tool itself is the parent document of the strand, and the strand is visually anchored to the FIND tool, the parent document is not on the strand. As the responses are received from the repositories, those documents matching the given set of parameters are added as child documents to the strand.

In step 335, the queue for responses is checked for responses from the repositories. When a response is received indicating a document from one of the repositories that matches the given set of parameters, a child document is added to the FIND tool strand in step 340. In step 345, it is determined whether the document renderer attribute for the child document has been received from the repository. If not, then in step 350 a grey block is displayed on the FIND tool strand for the child document. When it is determined that the document renderer attribute has been received from the repository, the child document is filled in at step 355, by the renderer indicated by the renderer attribute.

Thus, as the FIND tool retrieves documents asynchronously from remote repositories over a LAN, each retrieved document is added to the FIND tool strand in the order the response was received. Until sufficient information is received to fill in the display of the document, the document is displayed as a grey block. Therefore, the requests to the repositories do not lock up the workspace viewer, which may update the workspace independently of the FIND tool operation, or may update the workspace in part as the results of the FIND tool are asynchronously received over the LAN.

Clipping

To clip a document is to restrict the viewable area of the screen object associated with a document in a view. This may be done by dragging any edge of a screen object toward its center. Clipping makes documents look smaller without moving them back in the Z dimension. A clip stop constrains the clipping edge of a document such that it can only be clipped to a specified set of positions.

Documents with clip marks contain hidden information beyond the edge of the document. The hidden information may be revealed by clicking on the clip mark, dragging the clip mark as far down as it will go, and releasing the mouse button. This unclips the hidden information.

Annotating Documents: Information Stickers

Whenever a new document is scanned, faxed or sent through electronic mail, and then subsequently fetched to a workspace, the system will annotate that document to indicate that it has not been read. The system may staple an information sticker to the new document, thereby creating a fixed visual relationship between the information sticker and the new document. After the information sticker is stapled to the document, the information sticker will be displayed in the position at which it was stapled relative to the new document whenever the new document is displayed. The fields of the information sticker and their contents depend on where the document came from. The user can add or delete fields within the information sticker and edit them as needed. The user will typically add information to help find the document later. The user may alternatively fill in the fields by dragging the document over a tool which has been set up to automatically fill in certain fields of the information sticker. Once the desired fields are added and filled in, there is no need to "file" the document in the traditional sense. The user can remove it from the workspace, put it in a pile, or retrieve it later using the values typed in the information sticker fields. As an alternative to stapling information stickers to new documents, the system may use another means of annotation, such as making the new document a specific color, or writing text to an attribute or editable field of the new document.

To add a note to a document, for example when the document is shared by multiple users, a user can also staple a sticker onto a document. The sticker is actually a simple text document that can be edited by the user.

Any page of any document can have a sticker stapled to it. To get a sticker, the user shift-drags a sticker off of a sticker pad. Specifically, the user may move the mouse cursor over a sticker pad screen object, press the mouse button and the shift key simultaneously, and remove a sticker off of the sticker pad. The user then moves the sticker over a document and releases the mouse button and shift key to staple the sticker to the document.

Clip Marks on Stickers

To add more information than there is room to add on the sticker, the user may pull down on the clip mark to make more room in which to type. To make the sticker small again, the user may grab the clip mark and drag it up until the sticker is the desired size.

Removing a Document from the Workspace

Removing a document from the workspace may cause the document, and its permanent attributes to be written back to the repository. When a document is removed from the workspace, the ephemeral attributes for that document within that workspace are lost. To remove a document from the workspace in an example embodiment, the user holds down the Shift key and drags the document out of the workspace window. When the mouse button is released while the document is outside of the window, the document or documents being dragged will be removed from the workspace. The documents are not deleted from their repositories, just from the workspace.

Sharing Documents Among Multiple Users

A first user and a second user sharing a repository can share documents. For example, a first user may show a document to a second user using a SHOW TO tool. The system allows the first user to call the document to the attention of the second user, and add a note to it if needed. The first user first selects the document and locates the SHOW TO tool in the tool rack. The first user then presses the SHOW TO tool's button by clicking the mouse over the button displayed on the SHOW TO tool, and the SHOW TO tool unclips one clip stop. Next, the first user enters the username of the second user, and optionally, a note regarding the selected document. The first user then presses the SHOW TO tool's button a second time, and the SHOW TO tool clips to its original size, and the documents remain where they are in the current workspace.

The person named will find the document in his or her IN BOX pile. An information sticker is added to the top of any document called to someone's attention. The sticker has the first user's name and the date it was called to their attention, along with any notes typed by the first user. If the document already has an information sticker on it, a new one with the new information is placed on top of it.

If the first user enters more than one name into the SHOW TO tool, the document is called to the attention of each of those users.

To create a customized SHOW TO tool to bring documents to the attention of a second user, the first user first selects the SHOW TO tool. The first user then presses the button on the DUPLICATE tool in the tool rack, or drops the SHOW TO tool onto the DUPLICATE tool. A new tool is thus created called "SHOW TO copy". The first user then changes the title of the tool so it contains the second user's name. Every time this tool is used, either by selecting documents and clicking its button, or by dropping documents on it, it marks the documents to the attention of the second user.

As stated above, when the first user calls a document to the second user's attention, the document appears piled under the IN BOX of the second user. When several new documents are called to the second user's attention at once, the first one to arrive is on top of the pile, the next to arrive just behind that, and so on. Documents on the pile that have already been seen but that have been left on the IN BOX pile are piled behind the batch of new documents.

When a document is piled in an IN BOX pile because a first user has marked it for a second user's attention, an information sticker is placed across the top of the document. A document that has not been read has a colored line across the top of the new document's information sticker. Other documents in the IN BOX pile have no colored line on their information sticker.

To read a document from the IN BOX, the user grabs it by the corner and pulls it close to the front of the workspace. Then the information sticker can be moved in order to see all of the first page of the document. The sticker can be moved to some other place on the document or pulled completely off.

The sticker may have a hidden message. To read the hidden message, the sticker must be unclipped. When the sticker is moved or unclipped, its colored line will disappear, signifying that the document is no longer new.

Every time a document is called to a user's attention, it is piled near the IN BOX if that tool is in the user's workspace. The user can set the time when documents are gathered, either to collect them only when requested or constantly.

Using Ephemeral Attributes to Share Documents Among Multiple Users

Figure 15:
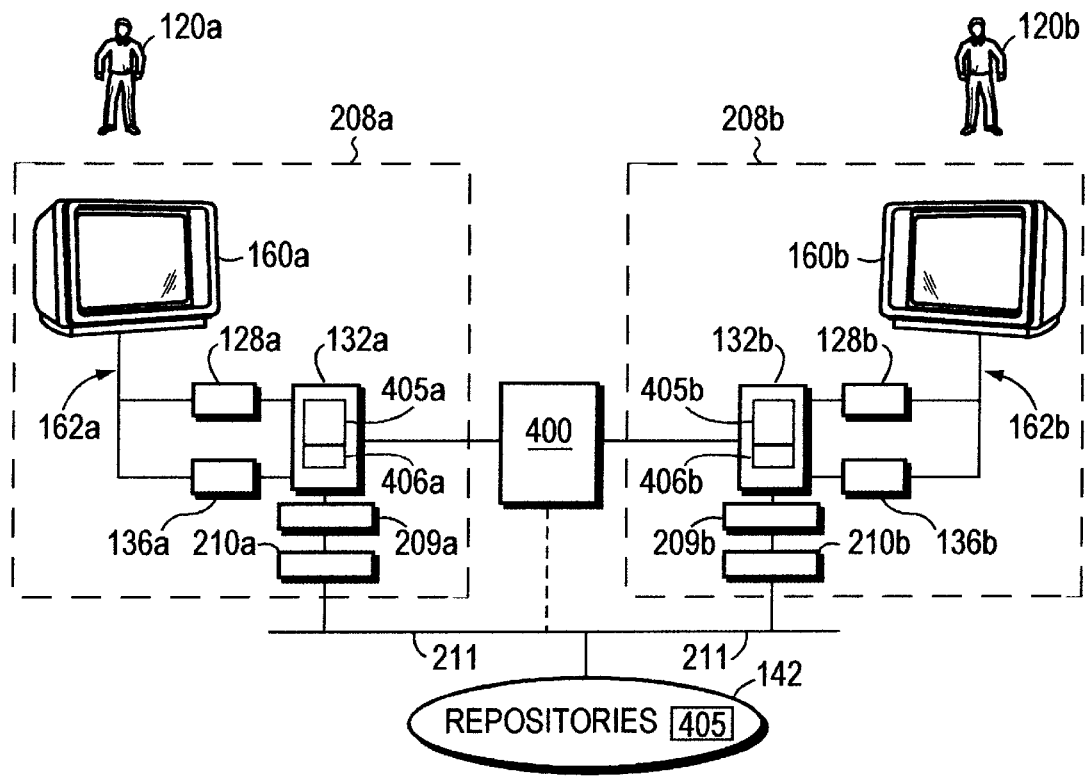
FIG. 15 is a diagram of an apparatus for sharing a document between two users.

FIG. 15 shows an apparatus for sharing the visual display of a document using ephemeral attributes. A first user 120a and a second user 120b are shown sharing a document 405. The first user 120a is shown using display device 160a. The display device 160a is shown coupled with a workspace viewer process 128a and a document renderer process 136a. The workspace viewer process 128a and document renderer process 136a are coupled with workspace cache 132a. The workspace cache 132a contains a first copy 405a of document 405, as well as ephemeral attributes 406a describing the visual display of document 405 on the display device 160a. The workspace cache 132a is coupled with a client module 210a and a network connection 400. The client module 210a is coupled with a LAN 211. The network connection 400 may optionally be coupled with the LAN 211.

A second user 120b is shown using a second display device 160b. The second display device 160b is shown coupled with a second workspace viewer process 128b and a second document renderer process 136b. The second workspace viewer process 128b and second document renderer process 136b are coupled with second workspace cache 132b. The second workspace cache 132b contains a second copy 405b of document 405, as well as ephemeral attributes 406b describing the visual display of document 405 on the second display device 160b. The second workspace cache 132b is coupled with a second client module 210b and the network connection 400. The second client module 210b is coupled with the LAN 211. The network connection 400 may optionally be coupled with the LAN 211.

During operation of the elements in FIG. 15, the first user 120a references document 405, and the client module 210a requests that document 405 be retrieved from the repositories 142 over LAN 211. The client module 210a receives document 405 over LAN 211, and the first copy 405a of document 405 is written into workspace cache 132A. As the first user 120a manipulates the display of document 405 on display device 160a, the values of ephemeral attributes 406a change to reflect the actual display of document 405 on display device 160a.

Further during operation of the elements in FIG. 15, the second user 120b requests the document 405 be retrieved from the repositories 142 over LAN 211. The second client module 210b requests that document 405 be retrieved from repositories 142 over LAN 211. The second client 210b receives document 405 over LAN 211, and the second copy 405b of document 405 is written into the second workspace cache 132b. The ephemeral attributes 406a are then transmitted through the network connection 400, and written into second ephemeral attributes 406b. The second ephemeral attributes 406b are then used by the second workspace viewer 128b, and the second document renderer 136b to display document 405 on second display device 160b, such that second user 120b views document 405 consistent with the display of document 405 on display device 160a, as seen and manipulated by the first user 120a.

As an alternative method for sharing the visual display between the two users, the ephemeral attributes 406a and 406b could be promoted to permanent attributes by each user, and then stored back to the repositories 142. Each client module may then access the repositories 142 to retrieve those permanent attributes, convert the permanent attributes to ephemeral attributes, and update the local display.

Creating a Document via the Merging of Existing Documents

Figure 16:
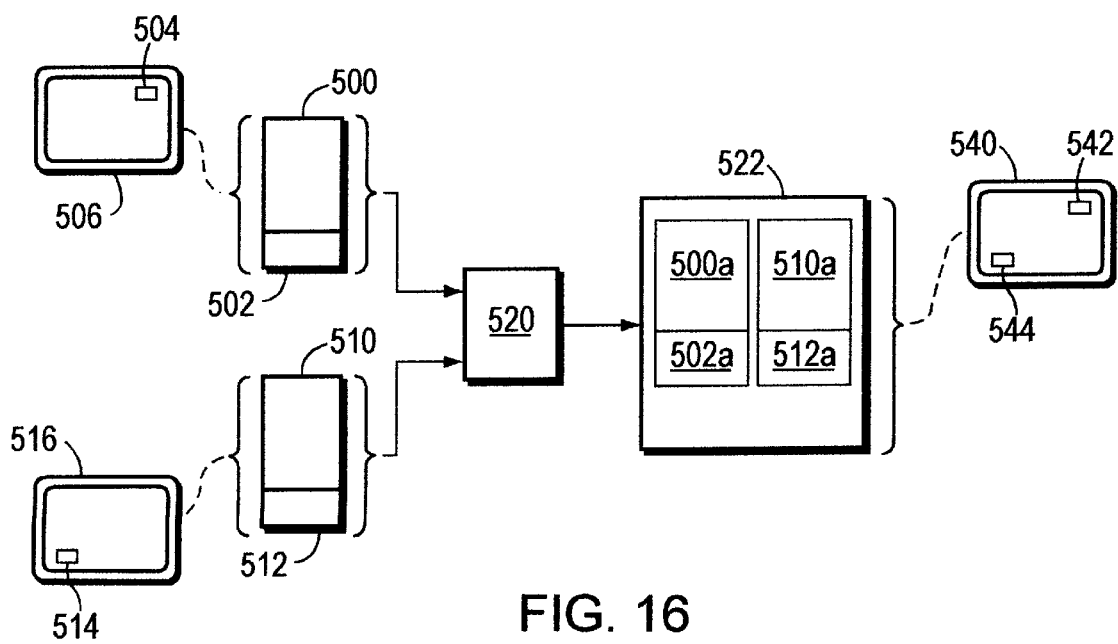
FIG. 16 is a diagram of an apparatus for merging multiple documents based on their visual display attributes.

FIG. 16 is a diagram of a method for merging multiple documents based on their visual display attributes. A first document 500 is shown associated with ephemeral attributes 502 within a first workspace 506. Applying ephemeral attributes 502 to first document 500 result in the first workspace 506 having screen object 504 representing first document 500. Similarly, second ephemeral attributes 512 applied to a second document 510 result in a second workspace 516 having a screen object 514 representing second document 510.

A merging process 520, typically implemented in script language, takes as input first document 500, ephemeral attributes 502, second document 510, and ephemeral attributes 512. The merging process 520 outputs a new workspace document 522, including a copies of the first document 500a, ephemeral attributes 502a, second document 510a and ephemeral attributes 512a. The new workspace document 522 produces a visual display 540 having screen objects 542 (corresponding to screen object 504), and 544 (corresponding to screen object 514).

A Multithreaded System for Retrieving Documents

Figure 17:
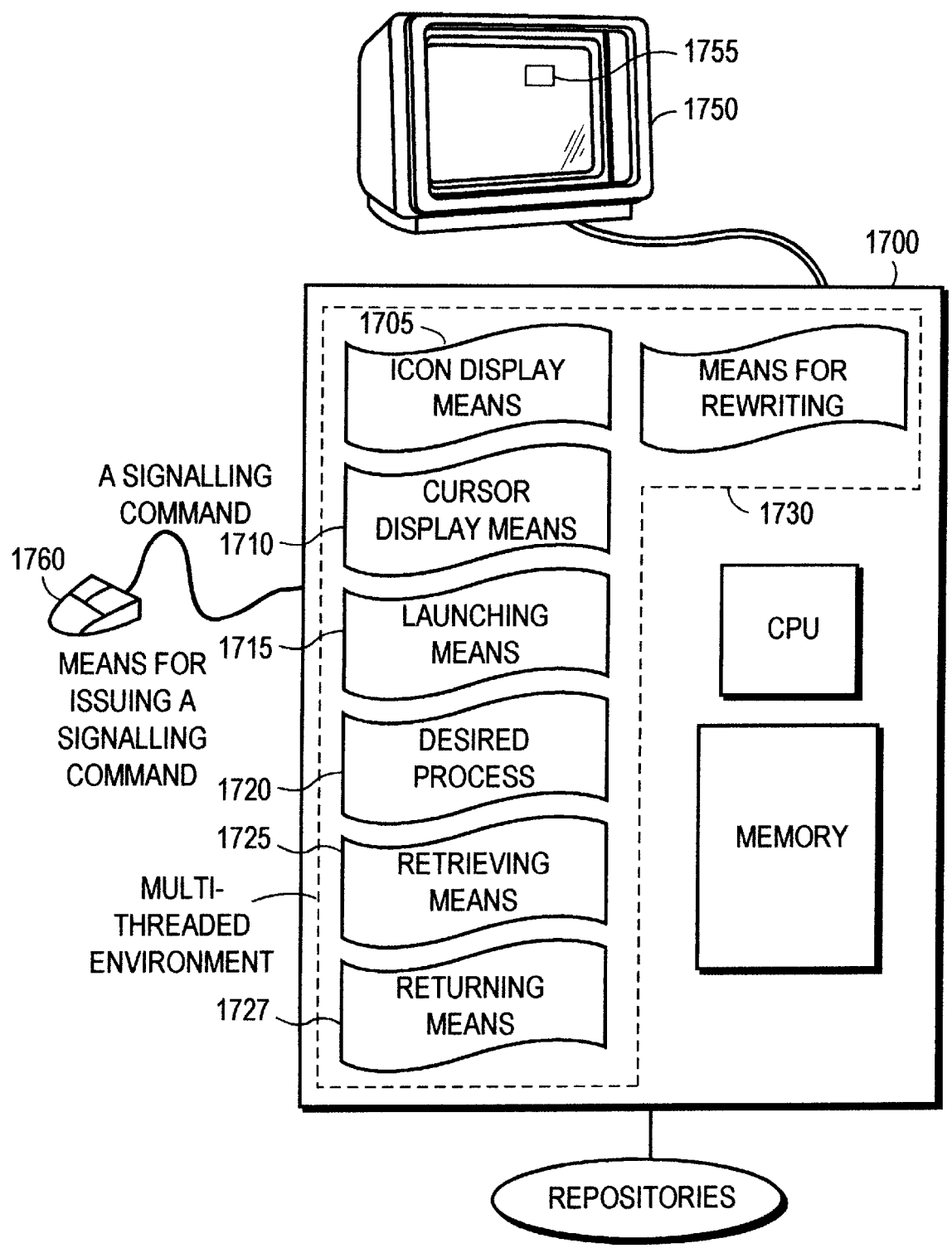
FIG. 17 is a diagram of an apparatus for retrieving documents from repositories and having no busy cursor.

FIG. 17 shows a multithreaded system for retrieving documents, including a display device 1750 coupled to a client device 1700. The client device 1700 includes a multithreading environment 1730, the multithreaded environment having a strand screen object display means 1705, a cursor display means 1710, a launching means 1715, a desired process 1720, a retrieving means 1725, and a means for returning 1727. The client device 1700 is further coupled with a user interface device 1760, and repositories 1765.

During operation of the elements shown in FIG. 17, the client device displays an strand screen object 1755, through the strand screen object display means 1705, and a cursor, through the cursor display means 1710, on the display device 1750. The user manipulates the user interface device 1760 to issue a signalling command to the client device 1700, the signalling command requesting that desired process 1720 be executed. The client device 1700 receives the signalling command, and the launching means 1715 then launches the desired process 1720, such that the desired process 1720 runs within the multithreaded environment 1730. The desired process 1720 then executes on the CPU 1740. Before the desired process 1720 completes execution, the cursor display means 1710 is allowed to execute on the CPU 1740, thereby maintaining an active cursor while the desired process 1720 makes progress in execution.

Programmable Documents

Figure 18:
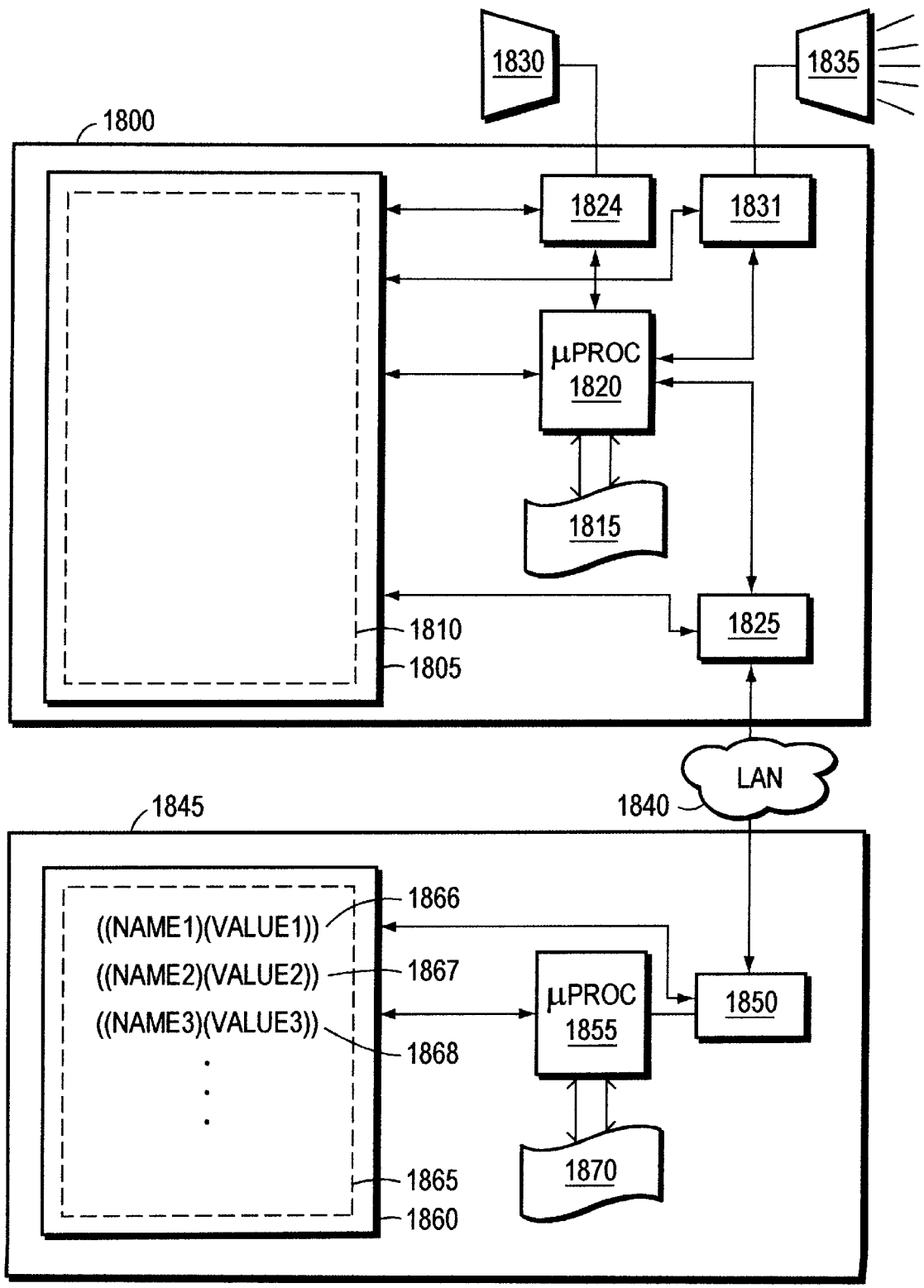
FIG. 18 is a block diagram of a system for processing information as documents.

FIG. 18 is a drawing of the elements in a system for processing information as documents. A first user system 1800 is shown having a first memory 1805. The first memory 1805 is shown coupled with a first microprocessor 1820, which in turn is coupled with a speech recognition engine 1824, a digital to analog converter 1831, and a first LAN controller 1825. The video controller 1825 is coupled with a video display device 1830, the digital to analog converter 1831 is coupled with a loudspeaker 1835, and the LAN controller is coupled with a LAN 1840 and the first memory 1805. An interpreter process 1815 is coupled with the microprocessor 1820.

The LAN 1840 is also coupled with a second LAN controller 1850 within a second user system 1845. The second LAN controller 1850 is also coupled with second memory 1860. The second user system 1845 contains a second memory 1860, and a second microprocessor 1855. The second memory 1860 contains a document 1865, including attributes 1866, 1867 and 1868. Attribute 1866 consists of NAME1 and VALUE1, attribute 1867 consists of NAME2 and VALUE2, and attribute 1868 consists of NAME3 and VALUE3. A second interpreter process 1870 is coupled with the second microprocessor 1855.

During operation of the elements of FIG. 18, a user on second user system 1845 creates an executable attribute, for example attribute 1866, having VALUE1 that is script. The user may write the script of VALUE1, or the system may provide pre-packaged executable attributes. In a first example shown in FIG. 18, VALUE1 is script that is active mail. The microprocessor 1855 of the second user system 1845 instructs the second LAN controller 1850 to transmit the second document 1865 to the user system 1800 via the LAN 1840. The second LAN controller 1850 then transmits the document 1865 onto the LAN 1800, and the document 1865 is subsequently received by the first LAN controller 1825 within the first user system 1800.

When the first LAN controller 1825 receives the document 1865, it copies the document 1865 into the first memory 1805. Next, the first interpreter process 1815 processes the executable attribute 1866 by interpreting VALUE1, and executing the resulting object code on the first microprocessor 1820. When the resulting object code is executed on the first microprocessor 1820, an acknowledgement message is sent back onto the LAN 1840, addresses to the second user system 1845, informing the second user system that the document 1865 has been received by the first user system. As an alternative, the script in attribute 1866 could be interpreted by the first interpreter 1815 only when a user on the first user system 1800 reads the document 1865, and thus the acknowledgement message would indicate that the document 1865 has been read by the user on the first user system 1800.

In a second example shown in FIG. 18, VALUE2 in attribute 1867 within document 1865 contains sound information, such as voice mail, and VALUE3 in attribute 1868 contains instructions for speech recognition engine 1824. During operation of the second example, the second microprocessor 1855 instructs the second LAN controller 1850 to transmit the document 1865 to the first user system 1800. The LAN controller transmits the document 1865 onto the LAN 1840, and subsequently the document is received by first LAN controller 1825 in the first user system 1800. The first LAN controller 1825 writes the document 1865 into the first memory 1805. Next, the first interpreter 1815 processes attribute 1867 of the document 1865. VALUE2 of the attribute 1867 contains sound information, and the interpreter 1815 passes this sound information from VALUE2 to the digital to analog converter 1831, which converts the digitized speech information into analog signals that are passed to the loudspeaker 1835, causing the voice mail message to be played through the loudspeaker 1835.

The first interpreter 1815 further processes attribute 1868. VALUE3 of attribute 1868 contains a script that when interpreted and executed, instructs the speech recognition engine 1824 to convert the sound information contained in VALUE2 of attribute 1867 into text to be displayed on display device 1830. The first interpreter 1815 then interprets the script in VALUE3 of attribute 1868, and executes the resulting executable code on the first microprocessor 1820. When the resulting executable code is executed on the first microprocessor 1820, it instructs the speech recognition engine 1824 to convert the sound information contained in VALUE2 into text, and display the text on the display device 1830.

In this way, the voice mail message is passed within a programmable document, in this case document 1865, in an attribute of the document, in this case attribute 1867, and then either played through a loudspeaker 1835 on the destination user system, here first user system 1800, and passed to a speech recognition engine 1824 to be converted to text and displayed on display device 1830. Whether the document 1865 contains sound information is transparent to the LAN protocols used on the LAN 1840, as well as whether the sound information is to be played audibly or displayed as text. The script that is included in the programmable document may be provided by a user on the second user system, or provided as part of a system library.

Asynchronous Refresh of the Graphical Interface

Figure 19:
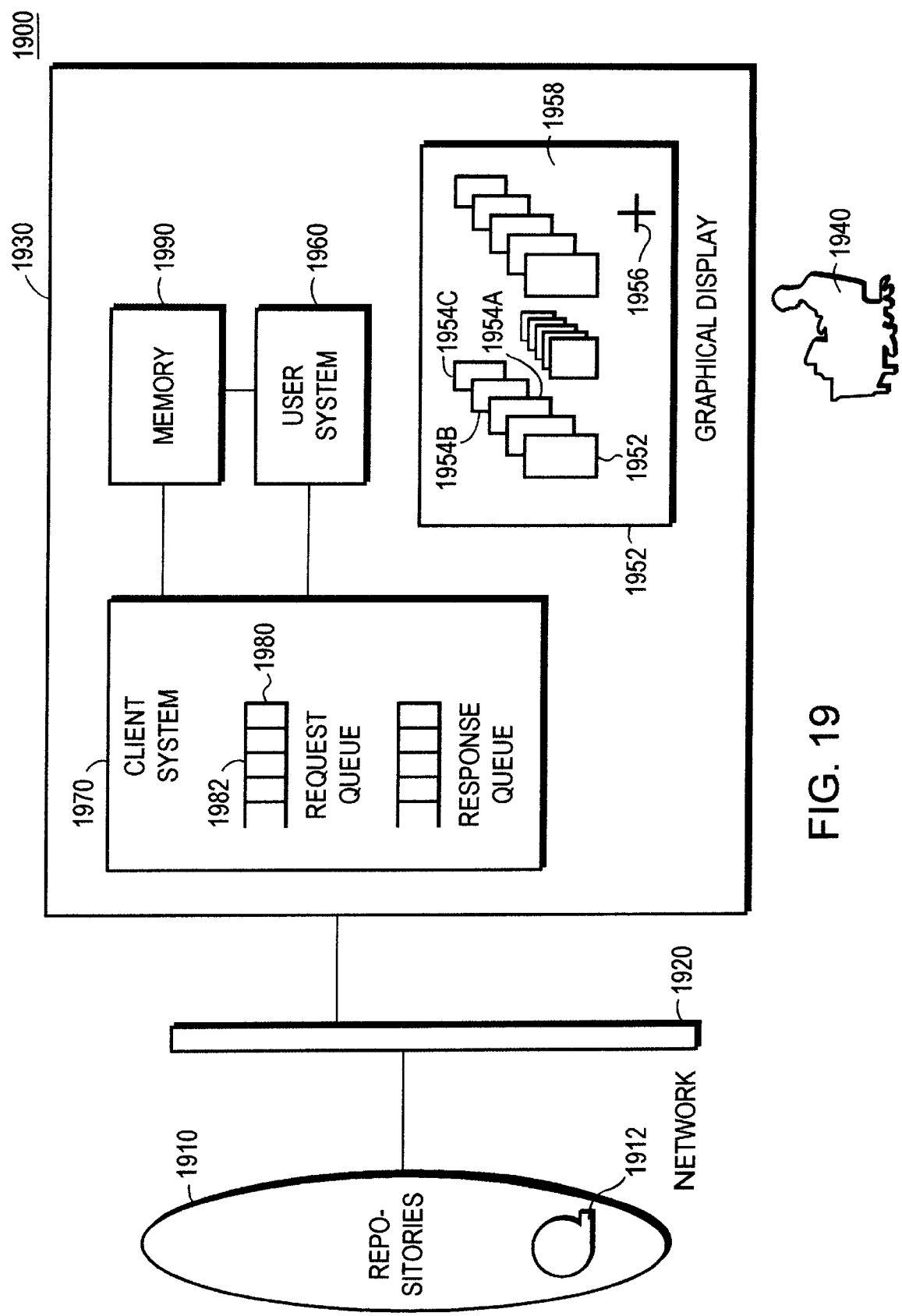
FIG. 19 is a block diagram of a network including repositories and a user station.

Turning now to FIG. 19, there is shown a block diagram of a document management system 1900. Documents are maintained in repositories 1910. A specific repository 1912 in repositories 1910 is shown. A specific repository may be, for example, a database system maintained on a server. Repositories 1910 may, as a further example, be many servers, each with one or more different database systems implemented thereon, and the servers may be geographically located in many distant cities. As a further alternative, a repository 1912 may be a disk attached to the users workstation 1930.

Network 1920 provides a datapath connecting the repositories 1910 with a user workstation 1930. User workstation 1930 may, for example, send electronic messages to each individual repository in repositories 1910 by transmitting the messages on network 1920. An individual repository 1912 may respond to a message received over network 1920 by transmitting a response message over network 1920 to user workstation 1930. A response message may, for example, be a report that no documents were found in response to the request, or for example, be a list of documents found in response to the request. As a further example, a response from a repository, may be a part of a document found in response to the request, such as a title, author, abstract, etc. As a still further example, a response from a repository may be a full copy of each document found in the repository in response to the request.

A user 1940 observes the screen of a graphical display 1950. An strand screen object 1952 is displayed on screen 1950. Strand screen object 1952 is established in a blank form at the time that a request is transmitted by workstation 1930 onto network 1920. As responses from a repository are transmitted over network 1920 from repositories 1910, strand screen object 1952 is updated to show the latest response. For example, each document found in response to a request may be displayed as a document screen object 1954A, 1954B, . . . etc. The displayed document screen object 1954A, 1954B, . . . etc. is at first displayed in blank. Then as responses arrive at workstation 1930, the title, author, etc. is filled in on the corresponding displayed document screen object.

Several strand screen objects such as strand screen object 1956 and strand screen object 1958 may be simultaneously displayed on graphical display 1950. Each strand screen object, 1952, 1956, 1958 may represent a selected group of documents. Each group may be differently assembled. For example, a group of documents may be assembled in response to a request issued through a "find tool". Alternatively, a group may be selected from a first larger group of documents. As a still further example, groups may be assembled as further refinements and narrowing of requests by "find tools".

User system 1960 is made up of the control programs utilized by user 1940. For example, a request transmitted on network 1920 by workstation 1930 may be initiated by a "find tool". The find tool is located in user system 1960. User system 1960 cooperates with client system 1970. Client system 1970 maintains request queue 1980.

When user system 1960 initiates a request to repositories 1910, then client system 1970 transmits the request onto network 1920. The request is stored in memory 1990, and a pointer to the request is written into request queue 1980.

The outgoing message contains a "request number" field to identify the request. The request queue entry 1982 corresponding to a specific request message contains, for example, two fields where one field contains the "request number", and the second field contains a pointer to the storage location of the request in memory 1990. Accordingly, an incoming message is linked to request queue entry 1982 by the "request number", and the request queue entry 1982 connects the response to the request stored in memory 1990.

The request stored in memory 1990 is linked to the find tool in user system 1960 which initiated the request. Upon receipt of a response, the find tool is activated, and links the response into the associated display document screen object 1954A, 1954B, . . . of strand screen object 1952. In the event that there are a plurality of strand screen objects showing documents displayed on screen 1950, then the activation of the initiating "find tool" in user system 1960 insures that the proper strand screen object 1952 will be updated.

Referring now to FIG. 20, there is shown a partial field structure 20,000 of a request transmitted by client system 1970 onto network 1920. The request contains "request number" field 20,010. Also the request contains the "Request Message" field 20,020. The request number is an index which helps to keep track of requests and responses. The contents of request message field 20,020 are instructions to the specific repository to which request message 20,000 is directed.

Referring now to FIG. 21, there is shown the field structure of an entry in request queue 1980. Each time that a request is transmitted to a repository, a request entry 1982 is written into request queue 1980. Field 21,010 of request queue entry 21,000 contains the request number. Field 21,020 contains a pointer to a location in memory 1990 where there is stored a reference to the find tool which launched request message 20,000.

Referring to FIG. 22, there is shown a partial field structure of a response 22,000 transmitted by a repository in response to request 20,000. The request number is in field 22,010, and the repository read the request number from field 20,010 of request message 20,000 and wrote the request number into field 22,010 of response message 22,000. Upon arrival of response message 22,000 at workstation 1930, the request number in field 22,010 locates the corresponding request queue entry 1980 21,000, and then pointer 21,020 directs the apparatus to the location in memory 1990 containing the reference to the find tool which launched request message 20,000. The reference to the find tool pointed to by the contents of request queue entry field 21,020 directs the apparatus to update the strand screen object 1952, 1956, 1958 which initiated the request 20,000.

A response number may be contained in field 22,030 in order for the apparatus to keep track of the number of responses arriving from a particular repository 1912. For example, a response message may be expected from each document found in the repository. And if the request message 20,000 causes several hundred documents to be located in the repository 1912, then the response number in field 22,030 helps keep track of the responses.

Further, client system 1970 may maintain a response queue 1995. The DATA returned in field 22,020 of response message 22,000 is stored in a buffer. Response 22,000 22,020 is rapidly written into the buffer as the bits arrive at line speed of the network 1920. At a later time when the processor has some idle time, the processor, more slowly, writes the data 22,020 into permanent memory located in memory 1990.

Turning now to FIG. 24A, there is shown an event time axis 24,010. Time events are labelled by the time at which they occur, as T1, T2, . . . etc. At time T1 a find tool is launched in user system 1960 (FIG. 19) by an action of the user 1940. At a later time T2 the find tool transmits a first I/O request onto network 1920. Between time T2 and time T3 the find tool may transmit any number of I/O requests on the network. The last I/O request is transmitted on network 1920 at time T3. Each I/O request is of the type shown in FIG. 20, and each I/O request repository to search for a specified document. There can be, in an exemplary embodiment, only one I/O request transmitted to one repository. Or, in an alternative embodiment, there may be several I/O requests transmitted, with each request directed to a different repository.

The first response is received from a repository at workstation 1930 at time T4. The response is of the type illustrated in FIG. 22. Further responses from repositories are received at workstation 1930 at various times between time T4 and time T6. For example, the k'th response from a repository is received at time T5. At time T6 the last response from a repository is received by workstation 1930. That is, the repository determines that the search is completed at that repository and sends an "all done" message to workstation 1930, and that "all done" message is received by workstation 1930 at time T6.

Turning now to FIG. 24B, there is shown the time intervals for which the cursor 1956 is "active", that is the time intervals during which workstation 1930 is receptive to accepting a command from user 1940. Block 24,020 shows that the cursor is active during the time interval from the origin 24,030 to time Ti. At time T1 the find tool is launched (FIG. 24A) and the cursor goes busy at time T1 (FIG. 24B). The cursor stays busy until the last response is received from the repositories 1910 at time T6. The cursor remains active, and the workstation 1930 receptive to commands from user 1940, for times after T6, as shown by block 24,040.

Turning now to FIG. 24D, there is shown the time intervals during which graphical display 1950 is updated in response to receipt of response messages 22,000 from repositories 1910. At time T4, 24,050, the first response from a repository is received. Update of the appropriate strand screen object 1952 begins at time T4, 24,050 and continues until time 24,052. During the time interval between time T4 24,050 and time 24,052 the data returned in field 22,020 of response message 22,000 is transferred to memory 1990, user system 1960 responds to the request number in field 22,010 of response message 22,000, and the corresponding document screen object 1954B of strand screen object 1952 is updated. Likewise, beginning at time T5 the graphical interface 1950 is updated in response to the k'th response received at time T5, and finally at time T6 the graphical interface 1950 is updated from the last response received at time T6.

Multi-threaded Request and Response

Figure 25:
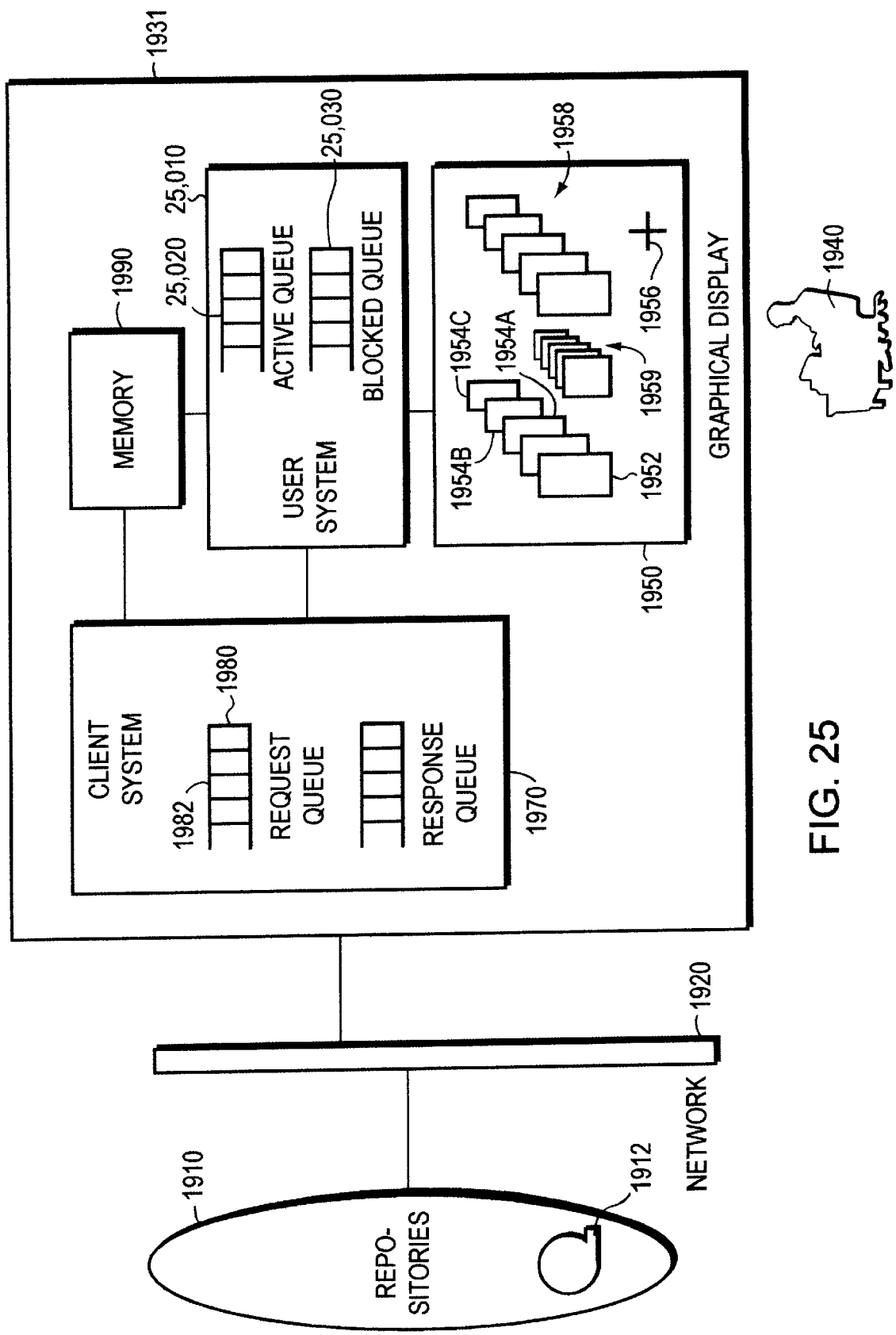
FIG. 25 is a block diagram of a network including repositories and a user's workstation.

Turning now to FIG. 25, there is shown a multi-threaded workstation 25,000. The repositories 1910, individual repository 1912, network 1920, client system 1970, memory 1990, and graphical display 1950 all operate substantially as described with reference to FIG. 19 where a single threaded work station 1900 was described.

User system 25,010 is multi-threaded. That is, user system 25,010 can execute a first process, and at an appropriate time put the first process to sleep, and begin to execute a second process. The second process then executes until it is put to sleep, when the first process can be awakened and its execution continued. Alternatively, when the second process is put to sleep a third process can be launched, and while it is executing both the first process and the second process are asleep. Then when the third process reaches a selected point in time, either of the asleep process may have its execution restarted. Or alternatively a fourth process may be launched with all of the first, second, and third process asleep. As executing processes reach convenient points in their execution, any process previously put to sleep may be awakened and its execution restarted.

Multi-threaded user system 25,010 maintains an active queue 25,020 and a blocked queue 25,030. When a new process is launched, say for example by an action of user 1940, the execution of the process is placed on the active queue 25,020. In the event that other processes are ahead of the new process on the active queue, they will be executed before the new process is executed. In a first exemplary embodiment, the active queue is executed in a FIFO mode, that is the first process into the active queue 25,020 is the first process executed.

In a second exemplary embodiment, the tasks waiting in the active queue are assigned a priority. The priority values range from highest priority to lowest priority. For example, there may be only two priority levels, or alternatively there may be a plurality of priority levels. All of the tasks with the highest priority execute first. For example the highest priority tasks may execute in FIFO order. After execution of the highest priority tasks is completed, the next highest priority tasks are executed, for example in FIFO order. Then the second next highest priority tasks are executed, for example in FIFO order. Finally, the lowest priority tasks are executed, for example in FIFO order.

Upon ending execution of an executing process, a decision is made concerning whether or not the process has completed its task. In the event that the executing process has completed its task, its execution is halted and the process is discarded. In the alternative event that the executing process has not completed its work, the executing process is put to sleep. Putting a process to sleep is accomplished by placing a reference to the process in the blocked queue 25,030.

Upon the occurrence of an event, the reference to a process placed on the blocked queue is transferred to the active queue 25,020. The process is then executed in turn in the FIFO mode, in the appropriate priority queue, when the processor becomes available.

An example of use of the multi-treading of the user system 25,010 is in transmitting request messages 20,000 onto network 1920. A user process, launched for example by a find tool, can transmit a process onto network 1920, and then the user process goes to sleep by being placed on the blocked queue. When a response to the request message 20,000 is received by workstation 25,000, the user process is awakened by being shifted from the blocked queue 25,030 to the active queue 25,020. The user process is then executed in turn from the active queue 25,020, and in executing can update the strand screen object 1952 in response to the response message 22,000.

Turning now to FIG. 24D, there is shown the active state of the cursor in a multi-threaded workstation 25,000. The cursor is active, and the multi-threaded workstation receptive to commands during the time intervals 24,060A, 24,060B, 24,060C, . . . etc. Upon the occurrence of an event requiring that another process execute, the cursor process is put to sleep. Upon completion of the "another" process, the cursor process comes up in the FIFO queue of active queue 25,000, and is again launched. Accordingly, the cursor becomes busy for only very short time intervals during which the other processes are executing.

To user 1940 the cursor appears to be almost always active. The competing processes do not block the cursor for long times such as from time T1 to time T6 as shown in FIG. 24B. The cursor is blocked for only millisecond time intervals as the competing processes execute, and then are put to sleep by being transferred to the blocked queue 25,030.

Asynchronous Screen Refresh of Responses from Repositories

The following discussion describes asynchronous arrival of responses from repositories in a system having a multiple threaded script interpreter.

Figure 26A:
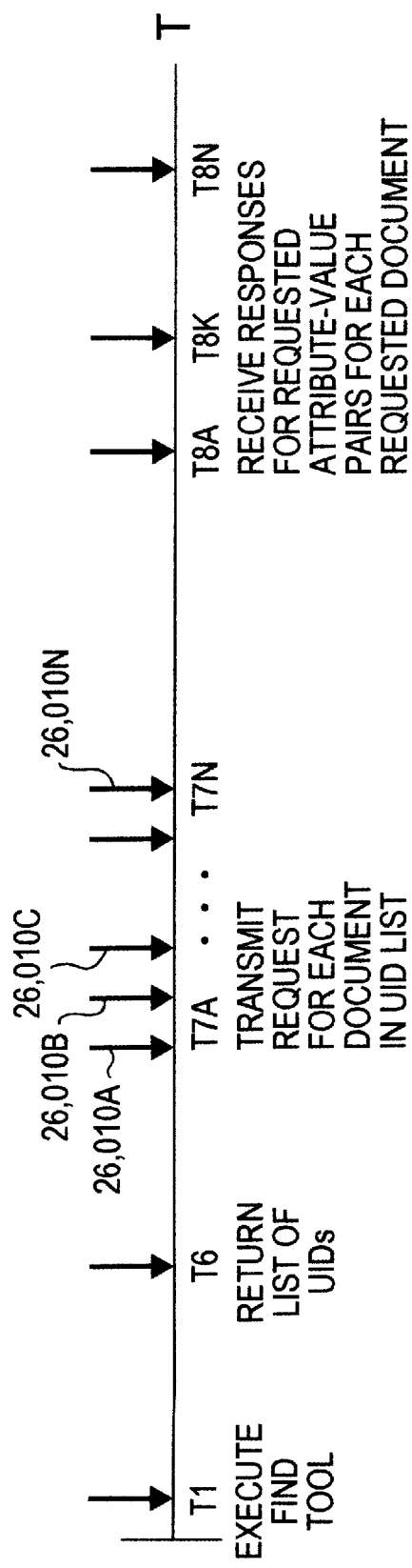
FIGS. 26A, 26B are timing diagrams showing operation of a document retrieval system.

Turning now to FIG. 26A, there is shown a time line for receipt of responses for requested attribute value pairs by a user workstation. At time T1, where T1 is also shown in FIG. 24A, a find tool is executed. By way of illustration, in this example, the find tool makes one request to one repository. At time T6, where T6 is also shown in FIG. 24A, a response to the find tool request is received. The response to the find tool is a list of unique identification numbers, UID, for each document found by the find tool request.

Figure 27:
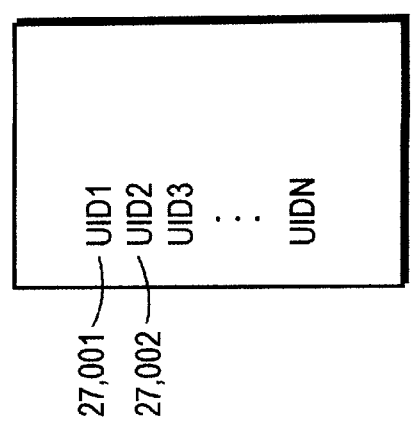
FIG. 27 is a block diagram of a UID list.

For example, the find tool may request all electronic mail for a particular user, where the mail has not been read. The response received at time T6 is a list of UIDs for the user's unread electronic mail. For example, in the event that the user has 25 unread electronic mail messages, the response received at time T6 will have a list of 25 UIDs. A typical UID list is shown in FIG. 27.

During the time interval from T6 to time T7A the Workspace Viewer 128 (FIG. 10) executes and draws a strand screen object on the users graphical display 1950, where the strand screen object is created having a document screen object drawn in grey for each document indicated by the UID list.

The screen objects are drawn on a two dimensional screen, however the data for the screen objects are maintained as three dimensional data in the three dimensional virtual workspace as described hereinabove with reference to FIGS. 1, 2, 3, 4, 5 and 10.

At time T7A the Workspace Viewer 128 executes, and transmits a request to the repository for selected attribute value pairs for the first document identified by the first UID 27,001 received at time T6. Time T7A is indicated by arrow 26,010A. At time indicated by arrow 26,010B the Workspace viewer transmits a request for selected attribute value pairs for the second document identified by the second UID 27,002. And similarly at times indicated by arrows 26,010C . . . through time indicated by arrow 26,010N the requests for the selected attribute value pairs are transmitted by the Workspace Viewer 128.

To continue the above electronic mail example, each of the 25 electronic mail messages will have a request for selected attribute value pairs transmitted by the Workspace Viewer. For example, the request may be for the sender's name, the title, the date received and the time received. In this example, 25 such requests will be transmitted to the repository, that is T7N is T7_25.

The Workspace Viewer executes rapidly within the user's workstation, and so the time delay from T6 when the UID list is received to time T7N when the last request for selected attribute value pairs is transmitted to the repository is only a few milliseconds.

Figure 26B:
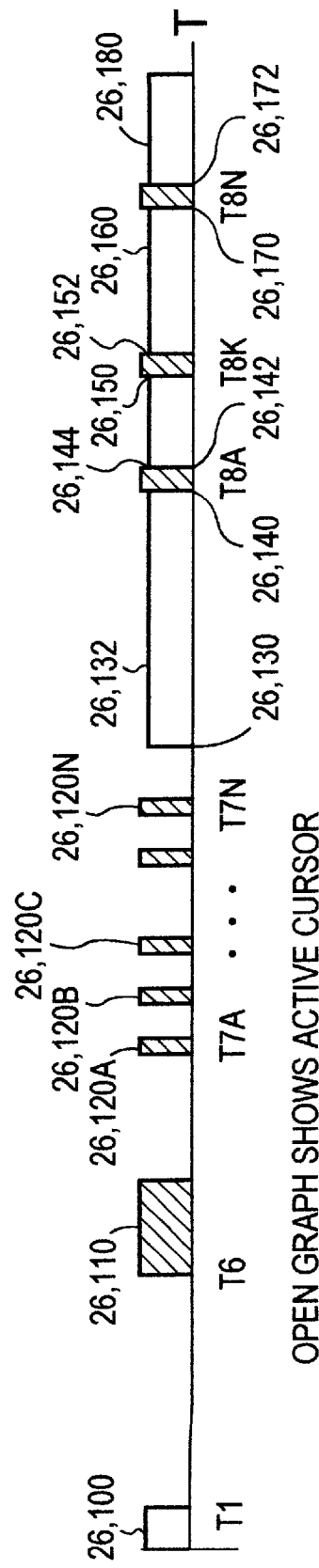

As shown in FIG. 26B, the cursor is active until time T1, as shown by open block 26,100. Between time T1 and time T6 the cursor is active during the intervals 24,060B, 24,060C . . . 24,060G, as shown in FIG. 24, and as discussed with reference to FIG. 24.

Beginning at a time just following T6, the Workspace Viewer executes to write ephemeral attributes for the documents in the UID list returned at time T6. Then the document renderer executes to draw the strand screen object with grey document screen objects, during the time interval shown by the cross hatched block 26,110.

The transmit process then executes, under the control of the find tool, during time intervals shown by broad lines 26,120A, 26,120B, 26,120C, . . . 26,120N, in order to request the selected attributes of each document whose UID was returned by the find tool at time T6.

The cursor process in the user's workstation awakens and the cursor becomes active at time 26,130, as shown by open block 26,132.

Returning to FIG. 26A, at a later time represented by time T8A the first response generated by the repository in response to the inquiries transmitted at times T7A, T7B, T7C . . . T7N is received by the user's workstation. The time order in which the repository services the requests is arbitrary as far as the user's workstation is concerned, and the responses may arrive in any time order at the user's workstation.

At time T8A the first received response is received by the user's workstation. At time 26,140 the cursor process goes to sleep and the cursor becomes busy. From time 26,140 to time 26,142 the Workspace Viewer 128 (FIG. 10) awakens and executes in order to service the response received at time T8A from the repository. The Workspace Viewer 128 services the response by writing the attribute values into the cache 132 (FIG. 10). At a later time the Document Renderer 136 (FIG. 10) then executes to re-write the screen with the updated attribute value pairs stored in cache 132.

The Document Renderer 136 can execute by being triggered by an interrupt generated upon a write to cache 132, or the Document Renderer 136 can run off of a timer so that the screen is refreshed at selected periodic intervals.

At time 26,142 the Workspace Viewer 128 goes to sleep and the cursor process once again executes to make the cursor active. The cursor remains active until the next response (the K'th response) from the repository is received at time T8K. As shown in FIG. 26B, the cursor goes to sleep at time 26,150 for the Workspace Viewer 128 to execute to service the response received at time T8K. The Workspace Viewer 128 then terminates upon writing the attribute value pairs into cache 132, and terminates at time 26,152. The cursor process then executes at time 26,152 to make the cursor active once again, as shown by open block 26,160.

Finally the last response is received from the repository at time T8N, the cursor process goes to sleep at time 26,170 and the Workspace Viewer 128 begins execution at time 26,170. From time 26,170 through time 26,172 the Workspace Viewer executes to write the attribute value pairs received in the response at time T8N into the cache 132. Then at time 26,172 the Workspace Viewer 128 goes to sleep and the cursor process executes to make the cursor active, as shown by open block 26,180.

As each response is received from the repository, at times T8A, . . . T8K, . . . T8N the attribute value pairs contained in each respective response is written into the cache 132. As the graphical display is periodically, or upon command, re-written by the Document Renderer 136, the new information recently written into cache 132 is written to the document screen objects of the strand screen object displayed on the graphical interface 1950.

During active cursor time shown by open blocks 26,100, 26,132, 26,144, 26,160, 26,180 the cursor is active. During these time intervals the system is responsive to additional commands. For example, another find tool may be executed during any of these time intervals. As a result, there may be several find requests outstanding at any one time.

The messages received by the user's workstation 1930 are sorted into the proper pile 1952, 1958, 1959, by the request number 20,010 in the request 20,000 and by the response number 22,030 in the response message 22,00, as shown in the fields shown in FIGS. 20, 21, 22, and 23.

The system as described with a multiple threaded execution in the user's workstation 1950 may have many outstanding requests to repositories, each request may be in a different state of response, and the results arrive back to the user's workstation asynchronously. As the results arrive back at the user's workstation the corresponding document screen objects of the corresponding pile, or strand screen objects, are asynchronously updated by the retrieved attribute pairs being written to cache 132 from the response message by the Workspace Viewer 128, and then the screen of the graphical interface is periodically re-written with updated cache information by the document renderer 136.

Registered Search

A registered search is a search, having selection criteria, which does not terminate. The search executes in a repository, and the search then goes into a "blocked" state. In the event that a new document is received by the relevant repository, the registered search then executes again. In the event that there is a match between the document and the search criteria, then the document is retrieved from the repository and placed in the user's workspace.

For example, a registered search for all of a user's "mail messages" may be launched. The search executes, finds all of the user's new mail, and then is blocked. In the event that a further new mail message is received by the repository, then the search is again executed and the new mail thereby retrieved into the user's workspace.

In an exemplary embodiment of the invention, the search is initiated in the user's workstation by the search task process being placed on the active queue 25,020 (FIG. 25). After all responses are received from the first execution of the search, the search task is placed on the blocked queue 25,030. In the event that a new document is received by the repository, the repository interface 805 (FIG. 8A), sends a data frame 22,000 across the network to the user's workstation. The data frame contains a message that a new document has been received by the repository. Upon receipt of the data frame 22,000, the user's workstation unblocks the search task by moving it from the blocked queue 25,030 to the active queue 25,020. The search task then executes, and retrieves the new document if the search criteria match with the new document in the repository.

A registered search can remain blocked all day as a user does his daily work. In the event that a document is received by a repository, the search task is moved from the blocked queue to the active queue and the search task then executes. By using a registered search, the user may keep track of the arrival of interesting documents at a plurality of various repositories while the user is working on other unrelated tasks.

In an alternative embodiment of the invention, the registered search maintains a process on the repository. After the first execution of the registered search process on the repository, the process becomes blocked in the repository. Upon the event of arrival of a new document at the repository, the registered search process is unblocked on the repository and runs on the repository. In the event that search criteria of the search match with the newly arrived document, then a message is sent to the user's node. Receipt of this message by the user's node unblocks a registered search process, and this process executes on the user's node to retrieve the document from the repository.

Single Threaded Script Interpreter

In a simpler alternative embodiment the script interpreter supports only single threaded execution. The document screen objects are asynchronously updated as the responses are received by the user's workstation. At time T1 the find tool executes, and continues executing until time T8A, when the last response from the list of UID values returned at time T6 is received by the user's workstation. All of the N requests for attribute value pairs of the N documents listed in the UID list, FIG. 27, are transmitted at times T7A . . . T7N. The last response is received by the user's workstation at time T8N. The find tool terminates execution at time T8, after receipt of the last response. Referring to FIG. 26A and FIG. 26B, the cursor in this simpler alternative embodiment remains busy from time T1 until time T8N.

However, even in the single threaded system, the screen 1960 is asynchronously updated by the find tool cooperating with the Workspace Viewer 128 and the Document Renderer 136. As a response is received by the user's workstation 1931, the attribute value pair carried in the data field 22,020 of response 22,000 is written to cache 132. The write to cache triggers the Document Renderer 136 to write the updated cache values to the screen 1960.

Building the Screen Object

Figure 28:
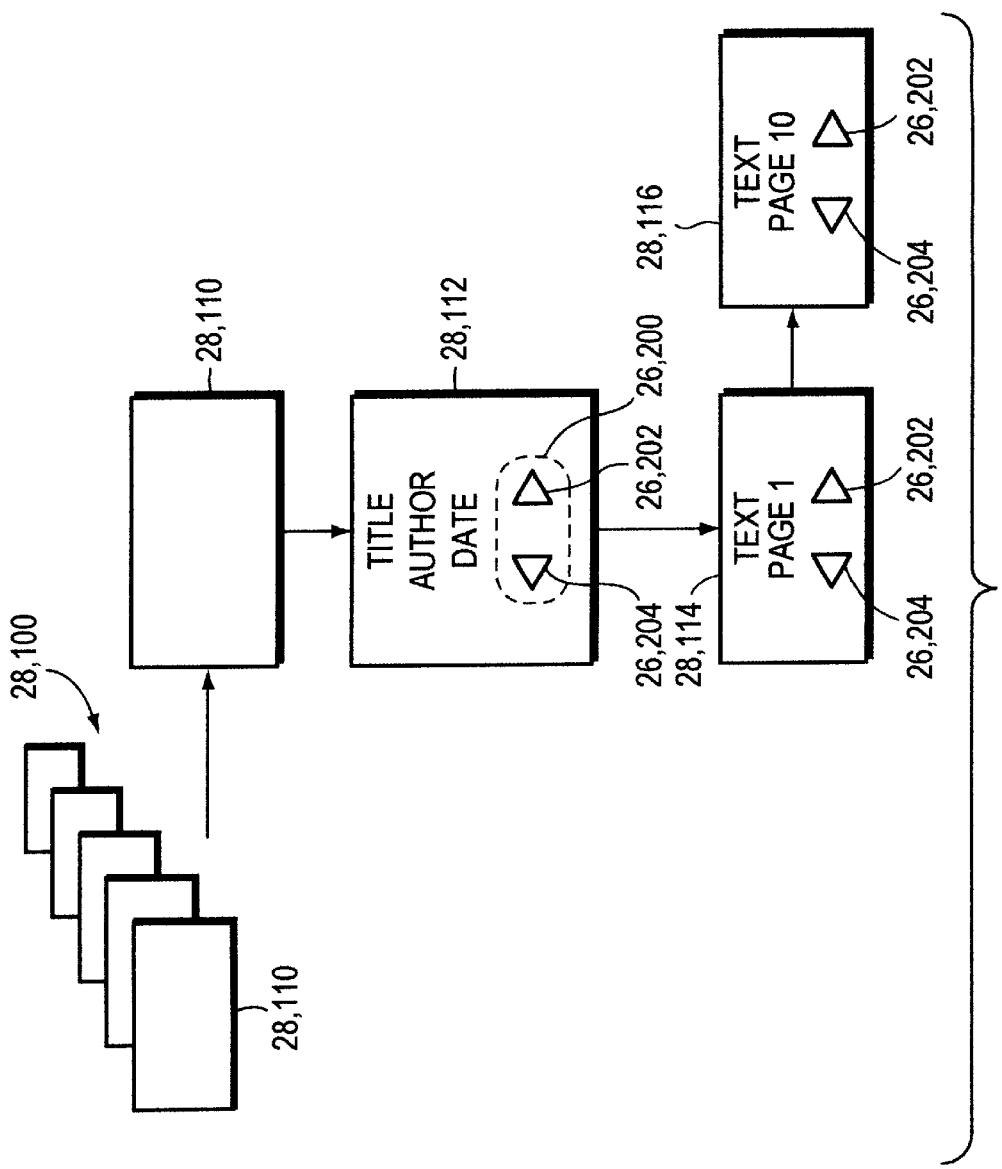
FIG. 28 shows page flipping.

Turning now to FIG. 28, there is shown the process of building the strand screen object 28,100 as responses are received from the repositories. The strand screen object 28,100 is drawn in blank upon receipt of the UID list at time T6 in response to a find tool execution initiated at time T1. Requests for selected attribute value pairs are transmitted at times T7A . . . T7N. A first response to a request for an attribute value pair for a specific document is received at time T8A. The document screen object 28,110 of the specific document is updated by having the values of the attributes contained in the response written into the corresponding document screen object 28,110. The attributes TITLE, AUTHOR, and DATE are shown written into the corresponding document screen object 28,112.

At a later time, for example time T8K for the K'th response, the document screen object corresponding to the document whose attribute value pairs are carried in the response received at time T8K are written into the corresponding document screen object. And so as the responses are received, the document screen objects are updated with the attribute value pairs carried in the responses. Finally, the last response is received at time T8N, and the last document screen object is updated using the contents of the response received at time T8N.

Advantages of a Multiple Threaded Script Interpreter

A multiple threaded script interpreter increases the time that the cursor is active and the users workstation is available to accept a command from the user, as discussed with respect to FIG. 24D. In operation, a multiple threaded script interpreter permits active processes to be put to "sleep" so that another process can run. The necessary state values for a process put to sleep are saved. Using the saved state values, the process can be awakened later, and can then begin executing at the location, or program counter, at which execution was suspended when the process was put to sleep.

The multiple script interpreter then permits the cursor to be active during the time intervals shown in FIG. 24D, intervals 24,060B, 24,060C, 24,060D, 24,060E, 24,060F and 24,060G.

Further, the multiple threaded script interpreter can roll processes into the CPU and roll them out in order to maintain the cursor active during time intervals 26,132, 26,144, 26,260, and 26,180 as shown in FIG. 26B.

Page Flipping

Page flipping is illustrated in FIG. 28. Button 26,200 is the "page" button. Button 26,200 is displayed on the user's graphical interface 1950 (FIG. 19, FIG. 25). In an exemplary embodiment of the invention, the page button is located on the document as it is represented as a document screen object 28,110. A document is selected by the user 1940 placing the cursor 1956 on the document screen object 28,110 and clicking a mouse 620 (FIG. 6) button.

In an exemplary embodiment of the invention, the document screen object displays the first page of the document as a default option. The user may then read other pages by clicking on an arrow 26,202 or 26,204 of page button 26,200. Clicking on the forward arrow 26,202 permits the user to read higher numbered pages. Clicking on reverse arrow 26,204 permits the user to move to earlier numbered pages. In an exemplary embodiment of the invention, holding the mouse button down with the cursor on either the forward arrow or the reverse arrow of the page button permits the pages to scroll by, and the user to view the pages as they are retrieved from the repository.

In operation, the user places the cursor on an arrow of page button 26,200 and clicks the mouse 620 button. The click on the arrow of page button 26,200 causes transmittal to the relevant repository of a request 20,000 (FIG. 20) for the next page of the corresponding document. A response 22,000 (FIG. 22) is received containing the next page of the document in the field DATA 22,020. The text of the page is written into the document screen object as shown in drawing 28,114. The screen object 28,110 of the document of interest may appear on the top of the pile as document screen object 28,102 so that the displayed page can be read. Or alternatively, the document screen object may be moved to the side by "dragging" in order to allow the text of the pages to be read. Also, the size of the document screen object 28,114 may be adjusted in order to permit comfortable reading of the text of the displayed page.

Further clicking on the forward arrow 26,202 of button 26,200 advances the page displayed on the document screen object 28,114. For example, the text of page 10 is illustrated in document screen object 28,116.

As a still further example, the text of several documents may be simultaneously displayed on the graphical interface 1950 by selecting them from the strand screen object 28,100, dragging them to a clear portion of the screen of graphical interface 1950, and flipping each to a desired page by clicking on page button 26,200. For example, in FIG. 28, the text of page 1 of a first document may be displayed in document screen object 28,114, and page 10 of a completely different document may be displayed in screen object 28,116. As an even further example, the first document screen object 28,114 may be removed from a first strand screen object 1952 (FIG. 19), and second screen object 28,116 may be removed from a completely different strand screen object 1958. Alternatively, the documents being read may be placed on top of their corresponding piles so that each can be read while remaining attached to the appropriate strand.

As a further illustration of the flexibility of the present invention, the first document screen object 28,114 may be a text document, and the second document screen object 28,116 may be a bit mapped drawing. As a still further illustration, second document screen object 28,116 may be a spread sheet. And the flexibility of the present invention permits these very different types of documents to be readily requested through appropriate find tools, for the requests to be asynchronously serviced, and the pages of the various documents easily changed by simply selecting the appropriate document screen object and clicking on an arrow of page button 26,200. The attribute value pairs are simply retrieved from the appropriate repository in response to the click command, and the value displayed when the message carrying the value is received by the user's workstation.

Scripting

Containers are the components where information is stored. Containers serve the function of variables in the scripting language. Every container is associated with a particular document in a workspace. A container includes fields and attributes of the document with which it is associated. Containers can contain information of various types, i.e., strings, numbers, dates, etc. The data types are implicit, in that it is possible to put information of any type into any container. All containers are basically alike in that, in general, any operation that can be performed on any container can be performed on any other container. In the present embodiment of the invention, data is converted by the scripting language from one type to another when necessary.

Each container is identified by a one-word name. This name may consist of alphabetic and numeric characters plus the underscore character. The first character must be alphabetic. Upper and lower case letters are equivalent in container names.

In an exemplary embodiment of the invention, there are three types of containers: permanent attributes or fields, ephemeral attributes or attributes, and locals.

Permanent attributes, or fields, are containers which are associated with documents as they are stored in data repositories. That is, a document can be thought of as consisting only of one or more fields. If a permanent attribute of a document is changed, the change will be visible to all users who are accessing that document. In this sense, permanent attributes are global to the entire repository. Permanent attributes are denoted by preceding the container name with the keyword FIELD.

Ephemeral attributes are containers that are associated with the representations of the objects as they appear in the user's workspaces and not with the documents as stored in the repositories. If an ephemeral attribute of a document is changed, the change will affect only the workspace in which the change is made. Thus, ephemeral attributes are "local" to a workspace.

There are some ephemeral attributes periodically updated by the system. These are called dynamic attributes. The dynamic attributes are the UID of the document currently being worked on, the UID of the document first clicked on by the user, the UID of the workspace, the UID of the user's default arrangement of documents, and the UID of the user's default repository.

Each document has a number of ephemeral attributes that have special meaning. These are known as essential attributes. The essential attributes include the width and the height of a document in world space pixels; the x position, the y position and the z position of the document in the workspace window; the x position, the y position and the z position in screen coordinates in units of pixels; the width and height of a document in screen-coordinate pixels; the horizontal and vertical offsets of the document's anchor point from its left and top edge; the amounts a document is clipped on the left, the right, the top and the bottom; and the horizontal and vertical positions of clip stops on the document. Ephemeral attributes are completely general containers and the scripter is free to attach new attributes to documents as needed. Ephemeral attributes are denoted by preceding the container name with the keyword ATTRIBUTE.

Locals are containers that exist only for the duration of a thread of execution and are local to that thread. Since threads often execute in parallel in the scripting language, it is usually appropriate to use locals to store temporary results within a thread. If permanent attributes or ephemeral attributes are used for this purpose, undesired interactions among parallel threads may result.

Container names that are not preceded by the FIELD or ATTRIBUTE keywords are assumed to be locals. The scope of a local is established at the point in a script where it is first assigned a value. Once the local has been assigned, it will be available for use and its values may be shared for the remainder of the script, even if the subsequent execution involves multiple threads. However, the locals are only shared within a single unit of script, i.e. a script stored within a single container, and not across message passing events.

Attributes are set by means of a script language. The language avoids the use of verbs in order to maintain elegance and simplicity. The scripting language straightforwardly sets an attribute in a container. The scripting language also makes use of side effects to invoke system actions, such as moving documents in the system. For example, change XPOS has a side effect that causes the document to move in the workspace.

Expressions in the script language consist of operator keywords, special operator symbols, string and numeric literals, and containers. Examples of expressions follow.

The "put" command is used to set the value of an attribute in the scripting language. For example, the expression put "Hello World." into title of me changes the title of the current document, me, to "Hello World."

The scripting language has simple conditionals. For example, if "Hello World." = title of me then put "Scriptor" into title of me else put "Hello World." into title of me end if uses simple conditional statements to toggle the title of the current document, me.

Arithmetic (+, −, /, *) and string concatenation (&) operators are provided for use on various types of data. For example, the expression put 1+2 into title of me changes the title of the current document, me, to the value "3."The expression, dump "concatenate" & "these" & "strings"

prints "concatenate these strings" to the computer display device.

A message may be sent to execute another piece of script with the "send" command. For example, send "script5" to me with "parameter string"

would execute the script in attribute "script5" of the current document. The parameter string argument may be retrieved in the script to set an attribute to the value of the string.

The scripting language command for iteration is the keyword "for." For example, the expression for 1 to 5 dump it end for repeatedly prints the contents of a special object, it, to the screen. The special object is set to each item over which it is iterating, in this case items 1 to 5.

Ephemeral attributes and intrinsic ephemeral attributes are accessed by prepending ATTRIBUTE to the attribute name. For example, the expression put "foo" into ATTRIBUTE title of me changes an ephemeral attribute of the current document to "foo."

Iteration is the basic control operation in the language. Most scripts are written as code fragments which are applied across a set of objects in a container. This often results in multiple threads of execution being initiated. This technique is the basis for the nonblocking "no busy cursor" behavior of the system.

Figure 29:
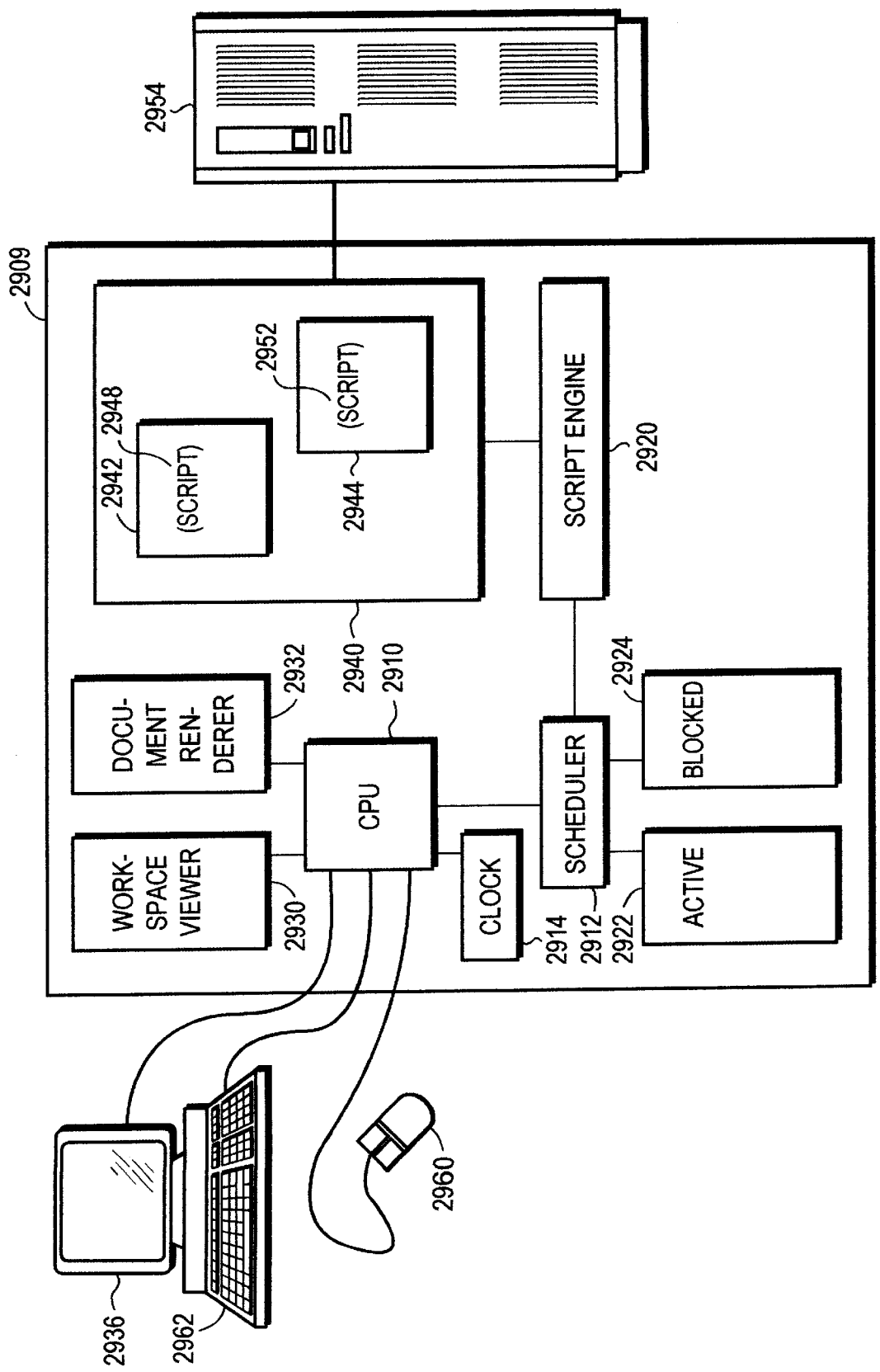
FIG. 29 is a diagram of a system with a multi-tasking script engine.

FIG. 29 shows a system 2909 having multi-threaded script engine. In FIG. 29, a CPU 2910 has a scheduler 2912, also called a message handler, which is regulated by a clock 2914. The scheduler 2912 controls a script engine 2920 which initiates script interpreter processes. The scheduler 2912 also controls two queues, an active queue 2922 and a blocked queue 2924. The scheduler 2912 controls these processes through signals or message sent to the other devices in the system 2909. The CPU 2910 also has a workspace viewer 2930 and a document renderer 2932 for reading and writing attributes to a cache memory 2940 and for writing to a display device 2936. The cache memory 2940 has a first document 2942 and a second document 2944. The first document 2942 has a first script 2948. The second document 2944 has a second script 2952. A repository 2954 provides long-term storage for documents. The repository could be a computer on the network with the system 2909, a storage unit on a remote node or a storage unit connected to the system 2909. A mouse 2960 and a keyboard 2962 are attached to the system for user input. Other means of input could also be used, e.g. a voice sensitive input device or a digitizer pad.

When the user of the system 2909 makes a request to initiate a process through an input device, such as the mouse 2960, the system 2909 fetches the first document 2942 and the second document 2944 from the repository 2954 and puts the first and second documents 2942, 2944 into the cache memory 2940. The script engine 2920 initiates execution processes of the first script 2948 and the second script 2952 and puts the script processes into the active queue 2922. The execution of the first script 2948 continues until it is unable to go on at which point the process is blocked by the scheduler 2912 and the process is moved to the blocked queue 2924. Blocking occurs when a process cannot complete immediately. For example, blocking would occur when a process has to wait for data coming over a network. When the first script 2948 is blocked, execution of the second script 2952 begins. Execution of the first script 2948 continues after the execution of the second script 2952 is finished or is also blocked. The workspace viewer 2930 and the document renderer 2932 read the changes in the cache memory 2940 and send them to the display device 2936. In a first embodiment of the invention, the cache memory 2940 is write-sensitive and sends a message through the scheduler 2912 to the workspace viewer 2930 and the document renderer 2932 when changes are made to attributes in the cache memory 2940. The workspace viewer 2930 and the document renderer 2932 read the message and then read the cache memory 2940. In a second embodiment of the invention, the workspace viewer 2930 and the document renderer 2932 periodically check the cache for changes.

It is to be understood that the invention is not necessarily limited to the particular embodiment shown herein. The invention may be adapted to a wide variety of information management systems. It is also to be understood that various adaptations and modifications may be made within the spirit and scope of the invention.

Keywords Used to Manipulate Containers put

This is the basic assignment statement in the scripting language. It causes the expression which immediately follows it to be evaluated and the result is put into a container according to the "destination operator" (e.g., into, before, after, etc.) that follows the expression.

EXAMPLE: Put 3.1415 into field PI

This example places the numeric value into a field named "PI" of the document containing this script.

set

This keyword is functionally equivalent to put. It is simply a syntactic variant that reverses the direction of the assignment.

EXAMPLE: set field PI to 3.1415

This example has identical effect of the example in put (above).

into

This keyword is used to indicate that the result of a put operator is to replace the previous value of a destination container.

EXAMPLE: Put "Hello World" into attribute title

This example sets the value of the attribute named "title" of the document containing this script to the string "Hello World".

before

This keyword is used to indicate that the result of a put operator is to be inserted at the front the previous value of a destination container.

EXAMPLE: Put "World" into attribute title

Put "Hello" before attribute title

This example causes the attribute named "title" to contain the string "Hello World."

after

This keyword is used to indicate that the result of a put operator is to be appended after the previous value of a destination container.

EXAMPLE: Put "Hello" into attribute title

Put "World" after attribute title

This example results in the attribute named "title" containing the string "Hello World."

of SYNONYM: FROM

This operator is used to refer to fields or attributes of documents other than the one containing the script being executed. It is preceded by a container name and is followed by an expression evaluating to a document identifier.

EXAMPLE: Put 200 into attribute xpos of docA

This example puts the value 200 into the attribute named "xpos" of the document whose document identifier is stored in the local named "docA".

field SYNONYM: FLD

Indicates that the following container name refers to a field.

EXAMPLE: put field A of it into fld B

This example copies the value of field named "A" of the document whose document identifier is contained in the local container "it" into field named "B" of the document containing this script.

fields

Fields is a special container which always contains a comma-separated list of all the fields of a document.

EXAMPLE: put the fields into field allfields

This example would set the field named "allfields" of the document containing this script to a list of all attributes of that document. E.g., if the document contained three fields "title", "date", and "body" then "allfields" would be set to the string "title,date,body".

attributes

This is a special container which always contains a comma-separated list of all the attributes of a document.

EXAMPLE: put the attributes of me into field allattrs

This example would set the field named "allattrs" of the document containing this script to a list of all attributes of that document, including both essential, e.g. "XPOS, YPOS, WIDTH, HEIGHT, and script-defined attributes.

remove

Used to remove a field or a property, or part of a field or property, from a document, or to delete an entire document.

EXAMPLE: remove field title of it

This example deletes the field named "title" of the document whose document ID is stored in the local container "it"

encrypted with

This function exists to permit tools to store repository passwords with a modicum of security. Encrypt takes an object string (i.e., a password) and another string to serve as an encryption key. It produces an encrypted string suitable for use in a repository connect operation. This is the only current use for this operator. There is no "decrypt" function.

EXAMPLE: put prop password encrypted with me into temp

This example encrypts the string in the property named "password" into the local container named "temp." The special local "me" is used as an encryption key This local always contains the document ID of the document containing the script. Using it as the key will cause the password to become invalid if the document is copied.

item SYNONYM: items

This keyword permits one to reference parts of a container value when those parts are separated by a delimiter character The default is a comma ",". Items are referenced by their position number(s) within the item list. If a position number is negative, the position is counted from the end of the list. The to operator is used to indicate ranges of items. Ranges can be forward or backward.

EXAMPLE 1

Put item 3 of "A,B,C,D,E" into answer

This example puts the string "C" into the local named "answer"

EXAMPLE 2

Put items 3 to 5 of "A,B,C,D,E" into answer "Answer" is set to "C,D,E."

EXAMPLE 3

Put Items "−1 to 1 of . . . "fleas.,dog has,My" into Fld "quote"

The field named "quote" is set to the string "Mydog has,fleas."

EXAMPLE 4

Put "I,say,yes" into answer

Put "no" into item −1 of answer

The local "answer" is set to the string "I,say,no."

by

This keyword permits the referencing of items that are delimited by strings other than the comma character. Delimiters can be of any length.

EXAMPLE 1

Put item 2 by "/" of "usr/roe/bin" into title

This example sets the local container "title" to the string "roe"

EXAMPLE 2

Put "value: xxx value: yyy/ value:zzz value:aaa"into params

Put 123 into item 2 by "value:" of item 1 by "/"of params

Put 456 into item 3 by "value:" of item 2 by "/"of params

This example sets the local container "params" to the string "value:123 value:yyy/ value:zzz value:456"

char SYNONYMS: chars, characters

This keyword permits "character-wise" access to strings. It is equivalent to item using the null string as the delimiter.

EXAMPLE 1 put "abcdefg" into message put chars −1 to 1 of message into message

This example sets the value of "message" to the string "gfedcba".

EXAMPLE 2 put chars 1 to 3 of word 2 of "hello there" into x

This examples puts the string "the" into the container named "x."

word SYNONYM: words

This keyword permits "word-wise" access to strings. It is equivalent to item using the space character as the delimiter.

EXAMPLE: put words 1 to 4 of . . .

"These are the times that try" into str

This example sets the value of "str" to "These are the times"

line SYNONYM: lines

This keyword permits "line-wise" access to strings. It is equivalent to item using the newline character as the delimiter.

EXAMPLE: put "Hello" into message put "World" into line 2 of message

This example sets the value of "message" to the string "Hello<NL>World", where <NL> is the newline character.

sentence SYNONYMS: sentences

This keyword permits "sentence-wise" access to strings. It is equivalent to item using the period character as the delimiter.

paragraph SYNONYMS: paragraphs

This function permits "paragraph-wise" access to strings. It is equivalent to item using two consecutive newlines as the delimiter.

number of

This keyword returns the number of items of a given type in a container. It may be used with the following keywords: items, chars, words, lines, sentences, paragraphs.

EXAMPLE put the number of chars in "abcdefg" into count the local "count" is set to the number 7.

me

This is a special local container which always contains the document ID of the document containing the script being executed.

EXAMPLE: put "TOOL" into field title of me

This example sets the field named "title" of the document containing the script to "TOOL".

target

This is a special local container which always contains the document ID of the document containing the script which received the initial event which ultimately caused the current script to execute. Typically, this is a document which received a button-press or some other user event. This can be different from me if the target script performed a send, for example.

EXAMPLE: put field title of the target into field title of me

This example sets the field named "title" of the document containing the script to have the same value of that field in the target document.

the

This keyword exists for script readability.

EXAMPLE: put 100 into attr xpos put 100 into the attribute xpos

The two statements are equivalent.

this

This keyword is similar to me, except that it can be used to reference the current workspace or repository, as well as the current document.

EXAMPLE: put field title of this document into x put field title of me into x

The two statements are equivalent.

document Synonym: documents

Indicates that the following name refers to a document. See the example under repository.

repository

Indicates that the following name refers to a repository.

EXAMPLE: put a new document in repository "home". . . into this workspace

A new document is created in the repository whose repository ID is "home" and it is brought into the workspace.

workspace

Indicates that the following name refers to a workspace.

See the example under repository.

Pronouns

Normally, when the name of a container is used, the intention is to refer to the contents of that container. For example the script put 3.14 into field pi causes the value of the field "pi" to be changed. Sometimes, however, it is necessary to use the contents of a container as a pointer to another container; i.e., to look into one container to find the name of another container. This can be done in several ways. Often, it can be done simply by being very explicit. For example, the following script is equivalent to the one above:

put "pi" into field constant put 3.14 into field (field constant)

Since this operation is relatively unusual, the awkwardness of this syntax is not a great issue. However, there are cases in which it is convenient or essential for dereferencing to be the rule rather than the exception. An example is in the case of the special local "it." Consider the following:

For each word of field X put "." after char −1 of it end for

Presumably, the intent of this script is to place a period after each word of the contents of X. But, if "it" were treated as a normal container, it would be "it" that would be modified, not the word that it pointed to. In order to make the script work as intended, the scripting language has a concept of a "pronoun", of which "it" is an example. Unlike normal container names ("nouns"), pronouns are always dereferenced in assignment statements. Thus, in the above example, the period is put after "each word", not after "it". It is possible to declare new pronouns using the is the or is a constructs. For example, the following script is equivalent to the above examples:

put "pill into field x field x is a constant put 3.14 into the constant

In this regard, pronouns are rather like "macros" in other programming languages in that they serve as a shorthand for referencing a possibly complex container. Finally, pronouns are useful in nested iteration to permit the referencing of the outer "it" from within an inner loop as in the example:

For each document in this workspace field title of it is the name for 1 to 5 put it after the name end for end for

Expressions

Expressions consist of operator keywords, special operator symbols, literals (string and numeric), and containers. Each operator in an expression is evaluated in an order of precedence. Within a level of precedence, the of keyword is right-associative. Evaluation of all other operators occurs from left to right. Each operator expects each of its operands to be of one or more specific types. If an operand of the incorrect type is provided, the operator will attempt to coerce the operand to the correct type. If this coercion fails, an error will result. If an operator that expects a number is given a string, it will attempt to coerce the string to a number. If that fails, 0 will be used instead.

Types

Expressions evaluate to one of the following types:

Numbers Numbers are stored as floating-point values.

String Character strings may contain any 8-bit ASCII value except the null character.

Boolean Booleans are either TRUE or FALSE. Any non-null value of an attribute is interpreted as TRUE.

Date Dates are represented internally as 64 bit values representing the date and time in milliseconds since the year 0.

Dates B.C. are represented as negative values. Dates from xxxxx B.C to yyyyyy A.D. may be properly represented.

Document Some operators return pointers to documents in a workspace or in a repository.

Workspace Some operators return pointers to a particular workspace.

Repository Some operators return pointers to a particular repository connection.

Numeric Operators plus SYNONYM: "+"

Adds two numbers. The result is of type number.

EXAMPLE 1 put 1+2 into x
The local x is set to 3.

EXAMPLE 2 put 3.1415 into attr PI
put attr PI plus "100" into field answer
The field answer is set to the number 103.1415.
minus SYNONYM: "−"
Subtracts two numbers. The result is of type number.
EXAMPLE: put 1 minus 2 into x
The local x is set to −1.
times SYNONYM: "*"
Multiplies two numbers. The result is of type number.
EXAMPLE: put 3*2 into x
The local x is set to 6.
divided by SYNONYM: "/"
Divides two numbers. The result is of type number.
EXAMPLE: put 1 divided by 2 into x
The local x is set to 0.5.
truncate
Truncates a number to the nearest lower integer.
EXAMPLE: Put truncate 1.6 into x The local x is set to 1.
round
Rounds a number to the nearest integer
EXAMPLE: put round 1.6 into x
The local x is set to 2.
mod
Returns the remainder when its second operand is divided by its first operand. Both operands are assumed to be numbers.
EXAMPLE: put 10 mod 3 into x
The local "x" is set to 1
"(" and ")"
Parentheses are used to alter the order in which expressions are evaluated.
EXAMPLE: put 3+4/2 into x
put (3+4)/2 into y
The local x is set to 5. The local y is set to 3.5.
String Expressions
concat SYNONYM: "&"
This operator concatenates two strings together to form a single string. If either operand is not a string, it will be coerced into one.
EXAMPLE: put "Fahrenheit" & (200+251) into field title
The field "title" is set to the string "Fahrenheit 451".
empty SYNONYM: null
This is a string constant which evaluates to the null string.
newline SYNONYM: NL
This is a string constant which evaluates to the newline character.
quote
This is a string constant which evaluates to the double-quote character.
string SYNONYM: strings
This operator forces the evaluation of its expression and coerces it to a string.
EXAMPLE: put the number of chars in string (3*400) into x The local x is set to the number 4.
Logical Expressions
true
This is a boolean constant which evaluates to the value TRUE.
false
This is a boolean constant which evaluates to the value FALSE.
and
This operator returns the boolean AND of its two arguments.
EXAMPLE: put true and false into result
The local "result" is set to a boolean false.
or
This operator returns the boolean OR of its two arguments.
EXAMPLE: put true or false into result
The local "result" is set to a boolean true.
not
This operator returns the boolean negation of its single argument.
EXAMPLE: put not 0 into result
The number 0 is interpreted as "false" and the local "result" is set to a boolean true.
equals SYNONYMS: "=", "is equal to", "is"
This is a boolean operator which interprets its two operands as numbers, strings or booleans and returns true if they are equal.
EXAMPLE: put 0 into field nada
put fld nada=3 into answer
The local "answer" is set to FALSE.
not equals SYNONYMS: !=, not equal, is not equal to
This is a boolean operator which interprets its two operands as numbers, strings, or and returns true if they are different.
EXAMPLE: put 0 into field nada
put fld nada !=3 into answer
The local "answer" is set to TRUE.
greater than SYNONYM: ">"
This is a boolean operator which interprets its two operands as numbers and returns true if the first is greater than the second.
EXAMPLE: put 0 into field nada
put fld nada >3 into answer
The local "answer" is set to FALSE.
less than SYNONYM: "<"
This is a boolean operator which interprets its two operands as numbers and returns true if the first is less than the second.
EXAMPLE: put 0 into field nada
put fld nada <3 into answer
The local "answer" is set to TRUE.
contains
This operator returns a boolean value indicating whether its second operand is contained in its first operand.
EXAMPLE: put not ("abc" contains "c") into answer
The value of the local "answer" is set to FALSE.
is in
This operator returns a boolean value indicating whether its first operand is contained in its second operand.
EXAMPLE: put "c" is in "abc" into answer
The value of the local "answer" is set to TRUE.
is not in
This operator returns a boolean value indicating whether its first operand is not contained in its second operand.
EXAMPLE: put "c" is not in "abc" into answer The value of the local "answer" is set to FALSE.

Date Expressions

Completely general arithmetic can be performed on expressions of type DATE.

date SYNONYM: time

Date converts its operand into a value of type DATE. If the operand is a number, it will interpret it as a number of seconds. If the operand is a string, it will attempt to parse the date as a date and/or a time according to a number of common date representation conventions. If it fails, an error results.

EXAMPLE 1 put the date "3/30/52 4:10 AM" into birthday

The local "birthday" is set to the date "30 Mar 1952 4:10:00.000"

EXAMPLE 2 put the date -1000000 into longago

The local "longago" is set to the date "21 Dec 0001 BC 13:46:40.000"

EXAMPLE 3 put "3/30/1952" into birthday put number(((date birthday) mod "1/8/0000")/"1/2/0000") into weekday This example sets "weekday" to the day of the week of the date string in "birthday". O=Saturday, 6=Friday. The string in "birthday" is interpreted as a date. This value modulus 7 days is equal to the day of the week in units of days. This number is then divided by 1 day in order to yield an integer from 0 to 6. This integer is then put into "weekday" as a number. The result in the case of the example is that weekday is set to 1.

now

This is a special token which always returns a date equal to the current system date and time.

EXAMPLE: put (now +"1/8/0000") > date "12/21/1993" . . . into alarm

In this example, the current date is fetched and 7 days are added to it. This date is then compared to the date 12/21/1993. If the current date is within 7 days of that date, alarm is set to TRUE, else it is set to FALSE.

Iteration and Control

Iteration Statements for

This is the basic iteration operator. It takes an operand which must evaluate to a collection of objects. These objects may be of any type. All statements up to the matching end for statement will be executed once for each object in the collection. Within these statements the token it will evaluate to a reference to the object associated with the current iteration. If the collection of objects has an intrinsic order, such as a range of numbers, or a set of documents sorted by some field, the iteration takes place serially. Otherwise, the iteration is scheduled in parallel, with one thread of execution created for each object.

end for SYNONYM: endfor

Terminates the body of an iteration. Each for must have a corresponding end for.

each SYNONYMS: all, every

This operator evaluates its operand into a set of objects and creates a collection consisting of all objects in the set. It is normally followed by an object type specifier, e.g., document, word, etc., indicating the object type for the iteration. If no object type keyword is specified, document is assumed.

EXAMPLE 1 put 0 into count for each document in this workspace put count + 1 into count end for This example will set the local "count" to the number of documents in the current workspace.

EXAMPLE 2 put 0 into count for each in this workspace put count + 1 into count end for

This example is functionally identical to Example 1. Note that the keyword document is assumed implicitly.

in

This keyword takes its single operand and makes it into a container. This is typically used with each and generally has no effect except for improved readability.

until

This is an optional clause of the for statement which can be used to prematurely terminate an iteration. It takes a single boolean operand which will be evaluated at the start of each iteration. If it evaluates to TRUE, the iteration will immediately terminate.

EXAMPLE put empty into thetype for each document in this workspace until...

thetype="library"

put the field type of it into thetype put the field version of it into libversion end for This example searches the workspace for a document with a field named "type" whose value is "library". When one is found, its "version" field is saved in the local "libversion" and the iteration terminates.

matching SYNONYMS: that matches

This optional clause of the for statement causes a collection of documents to only contain those documents that match a standard workscape "match expression" provided as a string operand to the matching keyword.

EXAMPLE

> put false into done
>
> for each document in this workspace...
>
>> matching "type=library" until done
>>
>> put the field version of it into libversion
>>
>> put true into done
>
> end for This script is equivalent to the example given in until, but is much more efficient.
to
This keyword is used to define collections consisting of ranges of integers. The iteration will always be serial.
EXAMPLE > for 1 to 100
>
>> put it into field count
>>
>> wait 1000
>
> end for This example will increment the number in field "count" by one once a second for 100 seconds.
  sorted by SYNONYM: SORTED
This keyword takes a container and a "sort expression" and causes a collection to be ordered according to the specified sort order. This permits the order of iteration to be controlled.
Control Statements
  if
Defines a conditional execution block. If operand evaluates to TRUE, statements are executed beginning at the following then up until the matching else or end if statement. If it is FALSE, statements are executed starting at the corresponding else statement, if any, and terminating at the corresponding end if.
EXAMPLE > put true into x
>
> if x then
>
>> put "hello" into field title
>
> else
>
>> put "goodbye" into field title
>
> end if This script results in the field "title" being set to "hello".
  then
Begins the "true" execution block of an if construct.
  else
Begins the "false" execution block of an if construct.
  end if SYNONYM: end if
Ends a conditional execution block.
  send..to
Sends a message to a document. It's single operand is evaluated as a string containing a message name. When a document receives a message, the document is searched for an attribute or a field, in that order whose name matches the message name. If one is found, the contents of the attribute or field are executed as script in a separate thread. If there is both an attribute and a field, the attr is used. This thread will execute independently of the sending thread, unless the wait keyword is used.
EXAMPLE > for each document in this workspace
>
>> send "onAppear" to it
>
> end for This will cause any document in the workspace which has an attribute or field named "onAppear" to execute it's contents as script.
  with
This construct permits the sending of the contents of a container along with a message. It is used with send..to. The included information can be accessed by the receiving message using the receive keyword.
EXAMPLE > for each document in this workspace
>
>> send "onAppear" to it with me
>
> end for This script will execute "onAppear" in each document, making the Document ID of the sending document available to the receiving scripts.
  and wait
This optional clause to send causes the current thread to block execution until the child thread, the one created by the send, terminates.
EXAMPLE > for each document in this workspace
>
>> send "onAppear" to it with me and wait
>>
>> receive temp
>>
>> put temp after status
>
> end for This script will execute "onAppear" in each document, making the Document ID of the sending document available to the receiving script. When each child terminates, any data returned using the return keyword is appended to the local "status."
  receive
This keyword permits the retrieval of information included in a send message using the with construct. It is also used after a send . . . wait construct to retrieve any information returned by the receiving script using the return keyword.

EXAMPLE: receive doc

> put the field title of doc into field title of me

If this script were executed as a result of the send shown in the example under with above, the script would set the field "title" of the current document to be the same as the one which sent the message to it.
  return
This keyword causes its operand to be returned to the script which caused the current thread to execute via a send ... wait construct. It does not terminate execution, but is typically used at the end of a script. The returned information is retrieved by the sender using receive.

EXAMPLE: return field title

This returns the title of the current document to the sender for retrieval using receive.

exit

Causes the current thread to unconditionally terminate execution.

sleep SYNONYM: wait

This causes the current thread of execution to be suspended for a given amount of time. Its operand is evaluated as type DATE.

EXAMPLE 1 sleep 5000

This causes the script to sleep for 5 seconds.

EXAMPLE 2 sleep "1/2/0000" This causes the script to sleep for one day.

sleep until

This causes the current thread of execution to be suspended until a specified absolute date/time has passed.

EXAMPLE: sleep until "3/30/1994 12:00"

The thread will sleep until noon on the given date.
Miscellaneous Statements
a new document in This keyword causes a new document to be created in a specified repository or an "ephemeral document" to be created in this workspace. It should be followed by a repository specification. The expression evaluates to the document identifier of the new document. Note that the new document must be added to the workspace and made visible before it can be seen by the user.

EXAMPLE 1

```
for a new document in repository "Home"
    put it into this workspace
    put 100 into attr width of it
    put 200 into attr height of it
    put 0 into attr xpos of it
    put 0 into attr ypos of it
    put 0 into attr zpos of it
    put true into attr visible of it
end for
```

This creates a new document of size 100×200 pixels, places it in the front of the upper left hand corner of the workspace, and makes it visible.

EXAMPLE 2 a new document in repository "Home" is the newdoc
put the newdoc into this workspace
put 100 into attr width of the newdoc
put 200 into attr height of the newdoc
put 0 into attr xpos of the newdoc
put 0 into attr ypos of the newdoc
put 0 into attr zpos of the newdoc
put true into attr visible of the newdoc The result of this example is identical to that of Example 1, but was done by putting the id of the new document into the pronoun "newdoc."

a copy of

This keyword causes a new document to be created in a specified repository, or an "ephemeral document" to be created in this workspace, which is an exact duplicate of an existing document. The keyword takes the UID of the source document as a parameter. The expression evaluates to the document identifier of the new document. Note that the new document must be added to the workspace and made visible before it can be seen by the user.

EXAMPLE

```
for each document in this workspace matching..
    "Selected=TRUE"
        a copy of it in repository "Home"... is the newdoc
        put the newdoc into this workspace
        put 0 into attr xpos of the newdoc
        put 0 into attr ypos of the newdoc
        put 0 into attr zpos of the newdoc
        put true into attr visible of the newdoc
end for
```

This creates a new document of size 100×200 pixels, places it in the front of the upper left hand corner of the workspace, and makes it visible.

debug

This statement controls various debugging features. They will be documented in a future version of this document.

dump

A debugging statement which dumps a description of any object in the language to the system's display device.
Essential Attributes Each document in a workspace has associated with it a number of special attributes associated with its visual representation in the workspace. These attributes, known as intrinsic attributes, are syntactically identical to regular attributes and may be read, in script in the same manner as any other container. They are special, however, in that their values are used by the system to determine where in the workspace documents are displayed and what they look like. Thus, changing these attributes has side effects which are the basic mechanism for controlling the contents of workspaces from script. The use of this technique avoids the need for a large number of special-purpose verbs which would otherwise be necessary in the language.

Each essential attribute must be set to a value of a specific type or types, e.g., a string, an integer, etc. If an attempt to set an essential attribute to a value of the wrong type, an error will result.

The following is a list of the essential attributes possessed by all documents in a workspace.
Document Position and Size XPOS
The X position of the anchor point of the document in world coordinates in units of pixels.
YPOS
The Y position of the anchor point of the document in world coordinates in units of pixels.
ZPOS
The Z position of the anchor point of the document in world coordinates in units of pixels.
WIDTH
The width of the document in units of world-space pixels, including both the visible part of the document and any parts that are clipped at the left and/or the right. This value is independent of the Z position of the document in the workspace. That is, it describes the world coordinate width, not the screen coordinate width.
HEIGHT
The height of the document in units of world-space pixels, including both the visible part of the document and any parts that are clipped at the top and/or the bottom. This value is independent of the Z position of the document in the workspace. That is, it describes the world coordinate height, not the screen coordinate height.
ScreenXPOS
The X position of the anchor point of the document in screen coordinates in units of pixels.
ScreenYPOS
The Y position of the anchor point of the document in screen coordinates in units of pixels.
ScreenWIDTH
The width of the document in units of screen-coordinate pixels. This is the actual screen width of the visible document, and does not include any clipped regions.
ScreenHEIGHT
The height of the document in units of screen-coordinate pixels. This is the actual screen height of the visible document, and does not include any clipped regions.
XOFFSET
The horizontal offset of the document's anchor point from its left edge.
YOFFSET
The vertical offset of the document's anchor point from its top edge.
BusyMark
If the value of this attribute is non-null, a "busymark" will be displayed on the document in a location determined by its layout, or in an arbitrary place if it is not included in the layout. If the value is between 0 and 100, the busymark will display the corresponding "percent busy".
Clipping
CLIPLEFT
The amount of the left-hand edge of the document that is hidden due to clipping, in units of pixels.
CLIPRIGHT
The amount of the right-hand edge of the document that is hidden due to clipping, in units of pixels.
CLIPTOP
The amount of the top edge of the document that is hidden due to clipping, in units of pixels.
CLIPBOTTOM
The amount of the bottom edge of the document that is hidden due to clipping, in units of pixels.
HCLIPS
This is a comma-separated list of distances, in world-coordinate pixels, from the left edge of the document, of the locations of horizontal clipstops, i.e., points to which horizontal clipping is normally constrained.
VCLIPS
This is a comma-separated list of distances, in world-coordinate pixels, from the top edge of the document, of the locations of vertical clipstops, i.e., points to which vertical clipping is normally constrained.
Miscellaneous Attributes
VISIBLE
If the value of this attribute is TRUE, the document will be displayed, otherwise, it will not be rendered i.e., it will be invisible.
SELECTED
If the document is selected, the value of this attribute will be TRUE. Setting it to TRUE will cause the document to become selected, setting it to FALSE will cause it to be not selected.
LASTX
The X position in world-coordinates of the location of the document before the last time it was moved by either the user or by script. This value is used by the "ZAP" mechanism of the interface during "put back" operations.
LASTY
The Y position in world-coordinates of the location of the document before the last time it was moved by either the user or by script. This value is used by the "ZAP" mechanism of the interface during "put back" operations.
LASTZ
The Z position in world-coordinates of the location of the document before the last time it was moved by either the user or by script. This value is used by the "ZAP" mechanism of the interface during "put back" operations.
The System Document
There is a special document which is implicitly present in every workspace known as the system document. The purpose of the system document is to provide scripts with access to and control of a number of parameters and internal state of the Workscape system and the underlying operating environment in which it is running. The system document has special attributes which may be examined and, in some cases, set by scripts. The document identifier of the system document is SYSTEM and it's repository ID is LOCAL. The following is a list of the attributes defined in the system document and their meanings:
Readonly Attributes
Connections
This attribute contains a comma-separated list of Repository Identifiers for each repository to which Workspace currently has an active connection.
ShiftKey
This attribute returns the state of the keyboard's SHIFT key at the time when the current script execution was initiated, specifically, at the start of the script named by the target. Possible values are "UP" and "DOWN."
ControlKey
This attribute returns the state of the keyboard's CONTROL key at the time when the current script execution was initiated, specifically, at the start of the script named by the target. Possible values are "UP" and "DOWN."
HostName
This attribute returns a string containing the name of the host on which the client application is executing. The potential values of the attribute are operating-system dependent.
OS
This attribute contains a string specifying the type of operating system under which the Workscape client is executing. The potential values of the attribute are operating-system dependent.

DisplayName

This attribute contains a string specifying the name of the display on which the workspace windows are being displayed. The values of this attribute are operating-system and window manager dependent.

Version

Contains a string indicating the current release version number of the Workscape client.

Read-Write Attributes

ScreenUpdate

This attribute controls how often the screen is updated. It's value is an integer representing the number of msec between screen updates. The default value is 1000.

ClickTime

The maximum time in msec between a mouse-down and a mouse-up event in order for the event to be considered a click event. The default value is 350.

DoubleClickTime

The maximum time in msec between two mouse click events in order for them to be considered a double-click event. The default value is 350.

DebugLevel

A non-negative integer controlling the amount of debugging output produced by the system. The default value is 0, which produces no debugging output.

MouseJiggle

A positive integer indicating the number of pixels that the mouse may move before the move is considered significant, e.g., at the start of a drag. The default value is 5.

DragClipWidth

The width in pixels of the clip targets on documents in world coordinates. The default value is 4.

DragClipMinHotWidth

Minimum document width in screen-coordinate pixels below which document clipping is disabled. The default value is 20.

ScreenBorderWidth

Width in screen-coordinate pixels of left and right screen "fish-eye" zone, i.e., the minimum number of pixels of a document that are displayed if the document is completely off the left or right edge of the window. The default value is 10.

ScreenBorderHeight

Height in screen-coordinate pixels of top and bottom screen

"fish-eye" zone, i.e., the minimum number of pixels of a document that are displayed if the document is completely off the top or bottom edge of the window. The default value is 10.

DragCornerWidth

Width in world-coordinate pixels of the "Z-drag" corner target of each document. The default value is 15.

DragCornerHeight

Height in world-coordinate pixels of the "Z-drag" corner target of each document. The default value is 15.

It is to be understood that the invention is not necessarily limited to the particular embodiment shown herein. The invention may be adapted to a wide variety of information management systems. It is also to be understood that various adaptations and modifications may be made within the spirit and scope of the invention.

What is claimed is:

1. A document management apparatus for managing operations with respect to a document, said operations specified by a number of users, said apparatus comprising:

A) a scheduler for controlling execution of a process that performs a user-specified operation with respect to said document, said process including at least one thread of execution;

B) a memory having a plurality of containers associated with said document, said containers including:

i) at least one permanent attribute container for storing information with respect to said document that is global among all said users;

ii) at least one ephemeral attribute container for storing information with respect to said document that is specific to at least one of said users; and iii) at least one local attribute container for storing information with respect to said document that is specific to said at least one thread of execution with respect to said document.

2. The apparatus in accordance with claim 1, further comprising a script engine responsive to the scheduler for executing said process responsive to a script so as to process said information stored within said containers and thereby perform said user-specified operation with respect to said document.

3. The document management apparatus in accordance with claim 1, wherein said ephemeral attribute container includes at least one dynamic attribute container for storing system-updated information with respect to said document.

4. The document management apparatus in accordance with claim 1, wherein said ephemeral attribute container includes at least one essential attribute container for storing information specifying a position of said document within a workspace.

5. A method for managing operations with respect to a document specified by a number of users, said method comprising the steps of:

A) executing a process that performs a user-specified operation with respect to information concerning said document, said process including at least one thread of execution; and B) storing said information associated with said document in a plurality of containers, said step of storing information further including the steps of:

i) storing information with respect to said document that is global among all said users in at least one permanent attribute container;

ii) storing information with respect to said document that is specific to a workspace of at least one of said users in at least one ephemeral attribute container; and iii) storing information with respect to said document that is specific to said at least one thread of execution with respect to said document in at least one local attribute container.

6. The method in accordance with claim 5, wherein said process-executing step includes the steps of:

A) processing and thereby changing said information stored in said containers, including the step of interpreting a script to generate changed information; and B) storing said changed information in selected ones of said containers, including the steps of i) storing changed information to be made available to all of said users in at least one permanent container, and ii) storing changed information that affects only the workspace of at least one of said users in at least one ephemeral container.

* * * * *